(12) United States Patent
Nam et al.

(10) Patent No.: US 11,781,801 B2
(45) Date of Patent: Oct. 10, 2023

(54) VACUUM ADIABATIC BODY AND REFRIGERATOR

(71) Applicant: LG ELECTRONICS INC., Seoul (KR)

(72) Inventors: Hyeunsik Nam, Seoul (KR); Bongjin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/957,503

(22) Filed: Sep. 30, 2022

(65) Prior Publication Data

US 2023/0036303 A1 Feb. 2, 2023

Related U.S. Application Data

(63) Continuation of application No. 16/766,562, filed as application No. PCT/KR2018/015713 on Dec. 11, 2018, now Pat. No. 11,493,261.

(30) Foreign Application Priority Data

Dec. 13, 2017 (KR) .................. 10-2017-0171616

(51) Int. Cl.
*F25D 23/02* (2006.01)
*F16L 59/065* (2006.01)
(Continued)

(52) U.S. Cl.
CPC .......... *F25D 23/028* (2013.01); *F16L 59/065* (2013.01); *F25D 21/04* (2013.01);
(Continued)

(58) Field of Classification Search
CPC .. F25D 23/028; F25D 23/065; F25D 2201/14; F25D 2323/021; F25D 2323/024;
(Continued)

(56) References Cited

U.S. PATENT DOCUMENTS

| 2,000,882 A | 5/1935 | Comstock |
| 2,464,526 A | 3/1949 | Palmer |

(Continued)

FOREIGN PATENT DOCUMENTS

| CN | 1420331 | 5/2003 |
| CN | 1603728 | 4/2005 |

(Continued)

OTHER PUBLICATIONS

U.S. Appl. No. 16/766,215, filed May 21, 2020.
(Continued)

*Primary Examiner* — Hanh V Tran
(74) *Attorney, Agent, or Firm* — KED & Associates LLP

(57) ABSTRACT

A vacuum adiabatic body includes a conductive resistance sheet which blocks heat conduction between plate members, and a sealing frame which covers the conductive resistance sheet. The sealing frame includes a side surface part, an outer surface part which is bent and extends from a side of the side surface part, and an inner surface part which is bent and extends from the other side of the side surface part. The sealing frame is provided as a configuration of a concave groove in which the width between the outer surface part and the inner surface part is smaller than the width of the side surface part. According to the present invention, a peripheral portion of the vacuum adiabatic body can be stably maintained.

20 Claims, 18 Drawing Sheets

(51) Int. Cl.
*F25D 21/04* (2006.01)
*F25D 23/08* (2006.01)
*F25D 23/06* (2006.01)

(52) U.S. Cl.
CPC ........ *F25D 23/087* (2013.01); *E05Y 2800/12* (2013.01); *F25D 23/065* (2013.01); *F25D 2201/14* (2013.01); *F25D 2323/021* (2013.01); *F25D 2323/024* (2013.01)

(58) Field of Classification Search
CPC ...... F25D 23/082; F25D 21/04; F16L 59/065; F16L 59/02; E05Y 2800/12
See application file for complete search history.

(56) References Cited

U.S. PATENT DOCUMENTS

| | | | |
|---|---|---|---|
| 2,518,673 | A | 8/1950 | Ellsworth |
| 2,989,156 | A | 6/1961 | Brooks et al. |
| 3,936,553 | A | 2/1976 | Rowe |
| 4,632,470 | A | 12/1986 | Jenkins et al. |
| 4,822,117 | A | 4/1989 | Boston, Jr. |
| 5,011,729 | A | 4/1991 | McAllister |
| 5,485,397 | A | 1/1996 | Yamazato et al. |
| 5,897,181 | A | 4/1999 | Avendano et al. |
| 6,038,830 | A | 3/2000 | Hirath et al. |
| 6,178,763 | B1 | 1/2001 | Brancheau et al. |
| 6,350,002 | B1 | 2/2002 | Takaoka et al. |
| 6,485,122 | B2 | 11/2002 | Wolf et al. |
| 6,725,624 | B2 | 4/2004 | Hirath et al. |
| 6,926,863 | B1 | 8/2005 | Goeldner |
| 7,407,240 | B2 | 8/2008 | Collins et al. |
| 8,211,523 | B2 | 7/2012 | Fujimori |
| 8,864,253 | B2 | 10/2014 | Görz et al. |
| 8,920,899 | B2 | 12/2014 | Fujimori |
| 9,074,717 | B2 | 7/2015 | Nomura |
| 9,155,419 | B2 | 10/2015 | Bird |
| 9,170,046 | B2 | 10/2015 | Jung et al. |
| 9,696,083 | B2 | 7/2017 | Kim et al. |
| 9,702,615 | B1 | 7/2017 | Chartrand et al. |
| 9,849,405 | B2 | 12/2017 | Smith |
| 10,129,994 | B1 | 11/2018 | Sulem |
| 10,180,280 | B2 | 1/2019 | Lee |
| 10,274,247 | B2 | 4/2019 | Jeong et al. |
| 10,712,080 | B2 | 7/2020 | Westlake et al. |
| 10,753,669 | B2 | 8/2020 | Dherde et al. |
| 10,760,849 | B2 | 9/2020 | Jung et al. |
| 10,837,696 | B2 | 11/2020 | Jung et al. |
| 10,907,883 | B2 | 2/2021 | Dherde et al. |
| 10,907,887 | B2 | 2/2021 | Jung et al. |
| 10,913,232 | B2 | 2/2021 | Dye et al. |
| 10,941,974 | B2 | 3/2021 | Jung et al. |
| 11,047,616 | B2 | 6/2021 | Jeong et al. |
| 11,079,171 | B2 | 8/2021 | Marinello et al. |
| 11,248,833 | B2 | 2/2022 | Kim et al. |
| 2002/0041134 | A1 | 4/2002 | Wolf et al. |
| 2002/0100250 | A1 | 8/2002 | Hirath et al. |
| 2003/0041612 | A1 | 3/2003 | Piloni et al. |
| 2004/0012315 | A1 | 1/2004 | Grace et al. |
| 2004/0035142 | A1 | 2/2004 | Yoon et al. |
| 2004/0226956 | A1 | 11/2004 | Brooks |
| 2006/0130513 | A1 | 6/2006 | Chang et al. |
| 2007/0133192 | A1 | 6/2007 | Alessandro |
| 2007/0228907 | A1 | 10/2007 | Luisi et al. |
| 2008/0095970 | A1 | 4/2008 | Takashima |
| 2008/0302441 | A1 | 12/2008 | Kelly et al. |
| 2009/0031659 | A1 | 2/2009 | Kalfon |
| 2009/0133225 | A1 | 5/2009 | Brugger |
| 2009/0284116 | A1 | 11/2009 | Görz et al. |
| 2010/0252698 | A1 | 10/2010 | Dye et al. |
| 2010/0279055 | A1 | 11/2010 | Song et al. |
| 2010/0287974 | A1 | 11/2010 | Cur et al. |
| 2011/0011106 | A1 | 1/2011 | Ahn et al. |
| 2011/0209493 | A1 | 9/2011 | Schenk et al. |
| 2012/0044131 | A1 | 2/2012 | Nussbächer et al. |
| 2012/0104923 | A1 | 5/2012 | Jung et al. |
| 2012/0125039 | A1 | 5/2012 | Hwang et al. |
| 2012/0128420 | A1 | 5/2012 | Schroeder et al. |
| 2012/0128920 | A1 | 5/2012 | Yoon et al. |
| 2012/0235551 | A1 | 9/2012 | Park et al. |
| 2012/0248125 | A1 | 10/2012 | Fricke et al. |
| 2013/0105494 | A1 | 5/2013 | Jung |
| 2013/0105495 | A1 | 5/2013 | Jung |
| 2013/0105496 | A1 | 5/2013 | Jung |
| 2013/0111942 | A1 | 5/2013 | Jung |
| 2013/0257256 | A1 | 10/2013 | Allard et al. |
| 2014/0369063 | A1 | 12/2014 | Kleo et al. |
| 2015/0030800 | A1 | 1/2015 | Jung et al. |
| 2015/0192355 | A1 | 7/2015 | Joo et al. |
| 2015/0245720 | A1 | 9/2015 | Isfort et al. |
| 2015/0276302 | A1 | 10/2015 | Roh |
| 2016/0047592 | A1 | 2/2016 | Rolek et al. |
| 2016/0109172 | A1 | 4/2016 | Kim et al. |
| 2016/0161174 | A1 | 6/2016 | Yi et al. |
| 2016/0220039 | A1 | 8/2016 | Chang et al. |
| 2016/0258671 | A1 | 9/2016 | Allard et al. |
| 2017/0167781 | A1 | 6/2017 | Mukherjee et al. |
| 2017/0176090 | A1 | 6/2017 | Allard et al. |
| 2017/0184341 | A1 | 6/2017 | Grimm et al. |
| 2017/0292776 | A1 | 10/2017 | Kim et al. |
| 2017/0336129 | A1 | 11/2017 | Cunningham |
| 2017/0370632 | A1 | 12/2017 | Jeong et al. |
| 2018/0180350 | A1 | 6/2018 | Yoon et al. |
| 2018/0238610 | A1 | 8/2018 | Jung et al. |
| 2019/0120544 | A1 | 4/2019 | Deka |
| 2019/0120547 | A1 | 4/2019 | Staud et al. |
| 2019/0145697 | A1 | 5/2019 | Naik et al. |
| 2019/0310011 | A1 | 10/2019 | Marinello et al. |
| 2020/0182393 | A1 | 6/2020 | Jung et al. |
| 2020/0370819 | A1 | 11/2020 | Kim et al. |
| 2021/0108852 | A1 | 4/2021 | Guizoni, Jr. et al. |
| 2021/0108882 | A1 | 4/2021 | Duford |
| 2021/0140704 | A1 | 5/2021 | Kim et al. |
| 2021/0190255 | A1 | 6/2021 | Allard et al. |
| 2022/0136762 | A1 | 5/2022 | Raskar |
| 2022/0205708 | A1 | 6/2022 | Harikrishnasamy et al. |

FOREIGN PATENT DOCUMENTS

| | | |
|---|---|---|
| CN | 2800193 | 7/2006 |
| CN | 100449231 | 1/2009 |
| CN | 101995140 | 3/2011 |
| CN | 102679663 | 9/2012 |
| CN | 102829593 | 12/2012 |
| CN | 103090615 | 5/2013 |
| CN | 103189696 | 7/2013 |
| CN | 103471314 | 12/2013 |
| CN | 103733007 | 4/2014 |
| CN | 105393073 | 3/2016 |
| CN | 105627657 | 6/2016 |
| CN | 106016931 | 10/2016 |
| CN | 106052248 | 10/2016 |
| CN | 107110593 | 8/2017 |
| CN | 107850377 | 3/2018 |
| DE | 19745825 | 4/1999 |
| EP | 1338854 | 8/2003 |
| EP | 1 808 657 | 7/2010 |
| EP | 2 589 904 | 5/2013 |
| EP | 2985057 | 2/2016 |
| EP | 2 995 888 | 3/2016 |
| EP | 3 193 110 | 7/2017 |
| GB | 890372 | 2/1962 |
| JP | S58-64239 | 4/1983 |
| JP | H04-327779 | 11/1992 |
| JP | 08-303937 | 11/1996 |
| JP | 2004-293913 | 10/2004 |
| JP | 2004293913 A * | 10/2004 |
| JP | 2008-089244 | 4/2008 |
| JP | 2013-002655 | 1/2013 |
| JP | 2014-126219 | 7/2014 |
| JP | 2015-129634 A | 7/2015 |
| KR | 10-0343719 | 7/2002 |
| KR | 10-2006-0071848 | 6/2006 |
| KR | 10-2017-0016187 | 12/2006 |

(56) References Cited

FOREIGN PATENT DOCUMENTS

| | | |
|---|---|---|
| KR | 10-0725790 | 6/2007 |
| KR | 10-2011-0006997 | 1/2011 |
| KR | 10-2013-0048529 | 5/2013 |
| KR | 10-2015-0012712 | 2/2015 |
| KR | 10-2016-0044842 | 4/2016 |
| KR | 10-1631904 | 6/2016 |
| RU | 1781519 | 12/1992 |
| RU | 2008 111 149 | 8/2006 |
| RU | 2315925 | 1/2008 |
| RU | 2468316 | 11/2012 |
| SU | 1742602 | 6/1992 |
| WO | WO 2000/0004935 | 2/2000 |
| WO | WO 02/12810 | 2/2002 |
| WO | WO 2006/011112 | 2/2006 |
| WO | WO 2011/007959 | 1/2011 |
| WO | WO 2012/050308 | 4/2012 |
| WO | WO 2013/164176 | 11/2013 |
| WO | WO 2014/196609 | 12/2014 |
| WO | WO 2016/105019 | 6/2016 |
| WO | WO 2017/023094 | 2/2017 |
| WO | WO 2017/023095 | 2/2017 |
| WO | WO 2017/080767 | 5/2017 |
| WO | WO 2017/180126 | 10/2017 |

OTHER PUBLICATIONS

United States Office Action dated Oct. 6, 2022 issued in co-pending related U.S. Appl. No. 16/767,899.
International Search Report and Written Opinion dated Mar. 20, 2019 issued in Application No. PCT/KR2018/015703.
International Search Report and Written Opinion dated Mar. 20, 2019 issued in Application No. PCT/KR2018/015706.
International Search Report and Written Opinion dated Mar. 20, 2019 issued in Application No. PCT/KR2018/015709.
International Search Report and Written Opinion dated Mar. 20, 2019 issued in Application No. PCTKR2018/015710.
International Search Report and Written Opinion dated Mar. 28, 2019 issued in Application No. PCT/KR2018/015713.
Russian Office Action dated Mar. 30, 2021 issued in RU Application No. 2020122677/10(039004).
Russian Office Action dated Apr. 20, 2021 issued in RU Application No. 2020122682/10(039009).
Russian Office Action dated Apr. 20, 2021 issued in RU Application No. 2020122685/10(039012).
Russian Office Action dated May 11, 2021 issued in Application 2020122686/10(039013).
United States Office Action dated Jul. 1, 2021 issued in co-pending related U.S. Appl. No. 16/766,233.
European Search Report dated Jul. 22, 2021 issued in EP Application No. 18888053.8.
Chinese Office Action dated Jul. 28, 2021 issued in Application No. 201880080796.2.
European Search Report dated Jul. 29, 2021 issued in Application No. 18889271.5.
European Search Report dated Jul. 29, 2021 issued in Application No. 18887635.3.
Chinese Office Action dated Aug. 4, 2021 issued in Application No. 201880080831.0.
European Search Report dated Aug. 9, 2021 issued in EP Application No. 18889452.1.
Chinese Office Action dated Aug. 20, 2021 issued in CN Application No. 201880080785.4.
Chinese Office Action dated Aug. 23, 2021 issued in CN Application No. 201880081068.3.
Chinese Office Action dated Sep. 2, 2021 issued in CN Application No. 201880080793.9.
United States Office Action dated Sep. 28, 2021 issued in co-pending related U.S. Appl. No. 16/766,562.
U.S. Office Action dated Oct. 28, 2021 issued in U.S. Appl. No. 16/766,215.
United States Notice of Allowance dated Dec. 27, 2021 issued in co-pending related U.S. Appl. No. 16/768,379.
Common Knowledge: 8.5.2 Installation of VFD and Connection Between Motor and PLCVFD (Apr. 22, 2022).
Chinese Office Action dated Apr. 28, 2022 issued in CN Application No. 201880081068.3.
Indian Office Action dated May 20, 2022 issued in Application 202017024179.
Korean Notice of Allowance dated Aug. 8, 2022 issued in Application 10-2017-0171630.
United States Office Action dated Nov. 7, 2022 issued in co-pending related U.S. Appl. No. 17/555,733.
United States Office Action dated Feb. 24, 2023 issued in co-pending related U.S. Appl. No. 16/767,899.
United States Office Action dated Feb. 21, 2023 issued in co-pending related U.S. Appl. No. 17/555,733.
U.S. Appl. No. 17/957,503, filed Sep. 30, 2022.
U.S. Appl. No. 17/986,625, filed Nov. 14, 2022.
U.S. Appl. No. 17/555,733, filed Dec. 20, 2021.
U.S. Appl. No. 17/705,764, filed Mar. 28, 2022.
U.S. Appl. No. 16/767,899, filed May 28, 2020.
U.S. Office Action dated Mar. 31, 2023 issued in Application No. 17/705,764.
U.S. Allowance dated May 16, 2023 issued in U.S. Appl. No. 16/767,899.
Chinese Office Action dated Apr. 26, 2023 issued in Application No. 202210685871.6.
Korean Notice of Allowance dated May 19, 2023 issued in Application No. 10-2017-0171661.
Chinese Office Action dated Apr. 29, 2023 issued in Application No. 202210306278.6.
European Office Action dated Jul. 12, 2023 issued in Application No. 18889271.5.

\* cited by examiner

VACUUM ADIABATIC BODY AND REFRIGERATOR

CROSS-REFERENCE TO RELATED APPLICATIONS

This application is a Continuation Application of U.S. patent application Ser. No. 16/766,562 filed May 22, 2020, which is a U.S. National Stage Application under 35 U.S.C. § 371 of PCT Application No. PCT/KR2018/015713, filed Dec. 11, 2018, which claims priority under 35 U.S.C. § 119 to Korean Patent Application No. 10-2017-0171616, filed Dec. 13, 2017, whose entire disclosures are hereby incorporated by reference.

TECHNICAL FIELD

The present invention relates to a vacuum adiabatic body and a refrigerator.

BACKGROUND ART

A vacuum adiabatic body is a product for suppressing heat transfer by vacuuming the interior of a body thereof. The vacuum adiabatic body can reduce heat transfer by convection and conduction, and hence is applied to heating apparatuses and refrigerating apparatuses. In a typical adiabatic method applied to a refrigerator, although it is differently applied in refrigeration and freezing, a foam urethane adiabatic wall having a thickness of about 30 cm or more is generally provided. However, the internal volume of the refrigerator is therefore reduced.

DESCRIPTION OF DRAWINGS

FIG. 13 is a view illustrating a state where fastening is completed, and FIG. 14 is a view illustrating a fastening process.

FIG. 16 is a view illustrating a state before the door hinge is installed, and FIG. 17 is a view illustrating a state where the door hinge is installed.

DESCRIPTION OF INVENTION

Figure 1:
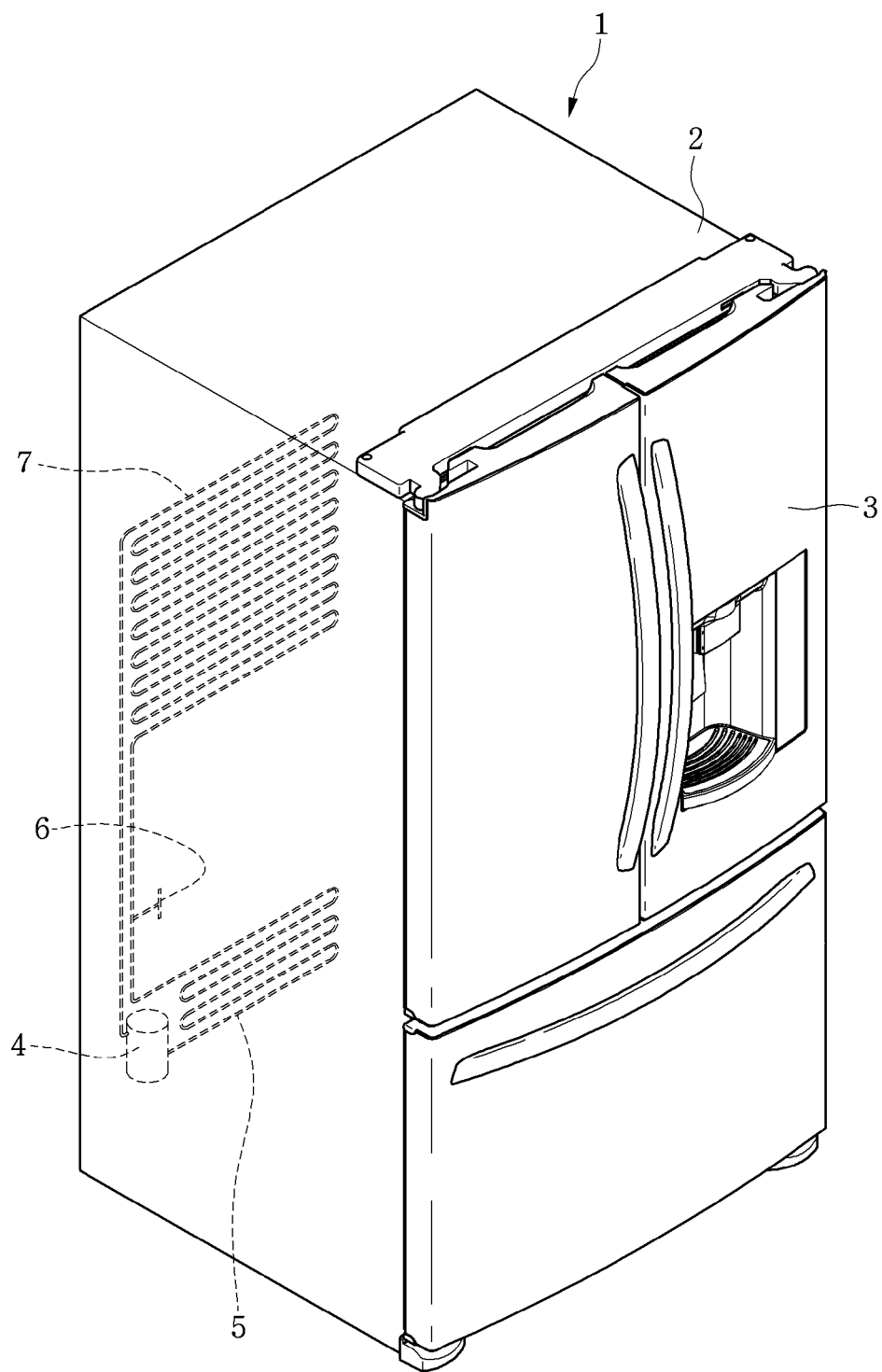
FIG. 1 is a perspective view of a refrigerator according to an embodiment.

In order to increase the internal volume of a refrigerator, there is an attempt to apply a vacuum adiabatic body to the refrigerator.

First, Korean Patent No. 10-0343719 (Reference Document 1) of the present applicant has been disclosed. According to Reference Document 1, there is disclosed a method in which a vacuum adiabatic panel is prepared and then built in walls of a refrigerator, and the exterior of the vacuum adiabatic panel is finished with a separate molding as Styrofoam (polystyrene). According to the method, additional foaming is not required, and the adiabatic performance of the refrigerator is improved. However, fabrication cost is increased, and a fabrication method is complicated. As another example, a technique of providing walls using a vacuum adiabatic material and additionally providing adiabatic walls using a foam filling material has been disclosed in Korean Patent Publication No. 10-2015-0012712 (Reference Document 2). According to Reference Document 2, fabrication cost is increased, and a fabrication method is complicated.

As another example, there is an attempt to fabricate all walls of a refrigerator using a vacuum adiabatic body that is a single product. For example, a technique of providing an adiabatic structure of a refrigerator to be in a vacuum state has been disclosed in U.S. Patent Laid-Open Publication No. US20040226956A1 (Reference Document 3). However, it is difficult to obtain an adiabatic effect of a practical level by providing the walls of the refrigerator to be in a sufficient vacuum state. Specifically, it is difficult to prevent heat transfer at a contact portion between external and internal cases having different temperatures. Further, it is difficult to maintain a stable vacuum state. Furthermore, it is difficult to prevent deformation of the cases due to a sound pressure in the vacuum state. Due to these problems, the technique of Reference Document 3 is limited to cryogenic refrigerating apparatuses, and is not applied to refrigerating apparatuses used in general households.

As a further alternative, the applicant of the present invention has applied Korean Patent Application Publication No. 10-2017-0016187, a vacuum adiabatic body and a refrigerator. In the present invention, both the door and the main body of the refrigerator are provided as vacuum adiabatic bodies, and, in particular, a large adiabatic material is added to the peripheral portion of the door so as to block cold air leaking from the contact part between the peripheral portion of the main body and the door. However, there is a problem that the manufacturing is complicated and the internal volume of the refrigerator is greatly reduced. In addition, since the inner space of the vacuum adiabatic body is empty in a vacuum, the strength is weaker than that of a product of the related art filled with a resin material such as polyurethane, which causes a problem such as bending or buckling.

The present invention is proposed in the background described above, and the objective of the present invention is to block cold air leaking from a contact part between a main body and a door.

The objective of the present invention is to secure a narrow sealing gap provided by a vacuum adiabatic body.

The objective of the present invention is to increase the internal volume of the refrigerator.

The objective of the present invention is to reinforce the weakness of a conductive resistor sheet which is thinly provided to resist conduction heat transfer to the outside and is vulnerable to an external impact.

The objective of the present invention is to install various parts necessary for the inherent operation of the appliance without affecting the adiabatic performance of the vacuum adiabatic body.

The objective of the present invention is to enable a worker to conveniently produce a refrigerator using a vacuum adiabatic body.

Technical Solution

The vacuum adiabatic body according to the present invention includes a conductive resistance sheet which connects a first plate member and a second plate member to each other and a sealing frame covering the conductive resistance sheet so that the conductive resistance sheet can be protected against an external impact.

The sealing frame may further include a side surface part, an outer surface part which is bent and extends from one side of the side surface part, and an inner surface part which is bent and extends from the other side of the side surface part, so that the three surfaces surrounding the conductive resistance sheet can be stably protected.

The sealing frame is provided with a configuration of a concave groove in which the width between the outer surface part and the inner surface part is smaller than the width of the side surface part so that the fastening can be conveniently performed.

The side surface part covers and protects the conductive resistance sheet, so that an external product may not touch the conductive resistance sheet.

The width of the side surface part is provided to be larger than the width of the conductive resistance sheet so that the outer surface and the inner surface including the side surface part can be protected together.

At least one of the outer surface part and the inner surface part is provided so that at least one portion thereof is in contact with the plate member, whereby the convenience of fastening can be improved.

The side surface part is thinner than the inner surface part and the outer surface part so that an elastic deformation can be obtained when the sealing frame is fastened.

The inner surface part is provided with a gap forming part for accommodating the part so that it is possible to secure a space for accommodating the parts and the like necessary for the operation of the vacuum adiabatic member.

The inner surface part includes a second member having the gap forming part; and a first member which is supported on the plate member side and to which the second member is fastened as a separate member, so that various parts can be placed in the inner surface part.

The inner surface part further includes a second reinforcing member to which the second member is supported and which reinforces the strength of the plate member, so that the strength of the vacuum adiabatic body can be reinforced.

The sealing frame is provided with a cut surface for installing a door hinge so that when the vacuum adiabatic body is used as a part of a refrigerator or the like, the problem of the action of the conductive resistance sheet can be prevented while the strength required for operation of the hinge is secured.

A hotline which is placed on an outer surface of the plate member; and a hotline accommodating portion which is provided in the sealing frame and in which the hotline is accommodated to prevent dew formation during operation of the refrigerator.

The refrigerator according to the present invention includes a sealing frame of an elastic material provided on a peripheral portion of the main body so as to be in contact with a gasket of a door, and the sealing frame includes a side surface part which has a width larger than the width of the peripheral portion of the main body along the peripheral portion so as to secure a contact area of the gasket; an outer surface part which is bent and extends at least partially along an outer surface of the main body at one side of the side surface part; and an inner surface part which is bent and extends at least partially along the inner surface of the main body at the other side of the side surface part. Accordingly, it is possible to maximize the adiabatic performance with respect to the space inside the refrigerator.

An end part of the inner surface part includes an inclined part inside the refrigerator which is provided to be inclined inwardly of the main body to widen the inner space of the main body. Accordingly, it is possible to secure a space inside the refrigerator as wide as possible.

The inner surface part is provided with a gap forming part on which the parts of the refrigerator are seated so that various parts necessary for the operation of the refrigerator can be fixed.

The main body is provided as a vacuum adiabatic body, and the conductive resistance sheet of the vacuum adiabatic body is protected by the side surface part of the sealing frame, thereby maximizing the adiabatic effect and stably using the vacuum adiabatic body.

The inner surface part of the sealing frame is engaged and supported by the reinforcing member of the main body thereby enabling the worker to conveniently work at the production site.

A reinforcement member which is fastened to a peripheral portion of a plate member constituting an outer surface of the vacuum adiabatic body to reinforce the strength of the vacuum adiabatic body is included, at least one of the outer surface part and the inner surface part can be slid along the corresponding plate member, the other of the outer surface part and the inner surface part is engaged with the corresponding plate member and supported so that the sliding thereof is impossible, so that the sealing frame can be more easily fastened.

The sealing frame includes: a side surface part which has a width larger than a width of a peripheral portion of the main body along a peripheral portion of the main body; and an outer surface part and an inner surface part which are bent and extends at the end part of the side surface part, any one of the inner surface part and the outer surface part is engaged to restrict movement, and the other one of the inner surface part and the outer surface part is configured to be freely moved with respect to the supporting surface, so that the worker can fasten the sealing frame to the main body side only by the engaging operation and the rotating operation.

A reinforcing member which reinforces the strength of the vacuum adiabatic body is further included, and at least one of the inner surface part and the outer surface part is constrained to the reinforcing member so that the worker at the production site can conveniently work.

The inner surface part is constrained in movement, and a gap forming part in which the part is accommodated is provided, so that necessary parts of the refrigerator can be installed.

A protrusion provided on the inner surface of the body is further included, the inner surface part is supported by the protrusion. Accordingly, the fastening of the necessary parts can be performed more conveniently.

Advantageous Effects

According to the present invention, there is an advantage that the energy use efficiency of the appliance can be increased by blocking the leakage of cold air at the contact part of the main body and the door in an appliance such as a refrigerator which is freely opened and closed by applying a vacuum adiabatic body.

According to the present invention, it is possible to obtain an action of increasing the internal volume of the appliance by applying the vacuum adiabatic body and an action of securing the sealing gap of the main body and the door sufficiently long.

According to the present invention, it is possible to improve the reliability of an appliance using a vacuum adiabatic body by blocking external access of the conductive resistance sheet.

The present invention can secure a space in which parts necessary for the operation of an appliance such as a refrigerator can be installed regardless of the adiabatic performance of the vacuum adiabatic body.

According to the present invention, a worker can conveniently produce a refrigerator using a vacuum adiabatic body, thereby improving the productivity of a product.

Hereinafter, specific embodiments of the present invention are proposed with reference to the drawings. However, there is no intention to limit the idea of the invention to the embodiments described below, a person skilled in the art which understands the idea of the present invention can easily propose other embodiments included within the scope of the same idea by adding, changing, and deleting constituent elements, or the like, but it will be understood that other embodiments are also included within the scope of the present invention.

Hereinafter, the drawings presented for the explanation of the embodiments may simply display parts which differ from the actual products, be exaggerated, simple, or detailed, however, this is to facilitate the understanding of the technical idea of the present invention, and should not be construed as being limited to sizes, structures, and shapes illustrated in the drawings. However, preferably, the actual shape may be illustrated as much as possible.

In the following embodiments, unless the embodiments do not collide with each other, the description of any one embodiment may be applied to the description of another embodiment, and some configurations of any one embodiment may be applied to another configuration in a state where only a specific part thereof is modified.

In the following description, the term 'vacuum pressure' means a certain pressure state lower than atmospheric pressure. In addition, the expression that a vacuum degree of A is higher than that of B means that a vacuum pressure of A is lower than that of B.

FIG. 1 is a perspective view of a refrigerator according to an embodiment.

Referring to FIG. 1, the refrigerator 1 includes a main body 2 provided with a cavity 9 capable of storing storage goods and a door 3 provided to open/close the main body 2. The door 3 may be rotatably or movably disposed to open/close the cavity 9. The cavity 9 may provide at least one of a refrigerating chamber and a freezing chamber.

Parts constituting a freezing cycle in which cold air is supplied into the cavity 9. Specifically, the parts include a compressor 4 for compressing a refrigerant, a condenser 5 for condensing the compressed refrigerant, an expander 6 for expanding the condensed refrigerant, and an evaporator 7 for evaporating the expanded refrigerant to take heat. As a typical structure, a fan may be installed at a position adjacent to the evaporator 7, and a fluid blown from the fan may pass through the evaporator 7 and then be blown into the cavity 9. A freezing load is controlled by adjusting the blowing amount and blowing direction by the fan, adjusting the amount of a circulated refrigerant, or adjusting the compression rate of the compressor, so that it is possible to control a refrigerating space or a freezing space.

Figure 2:
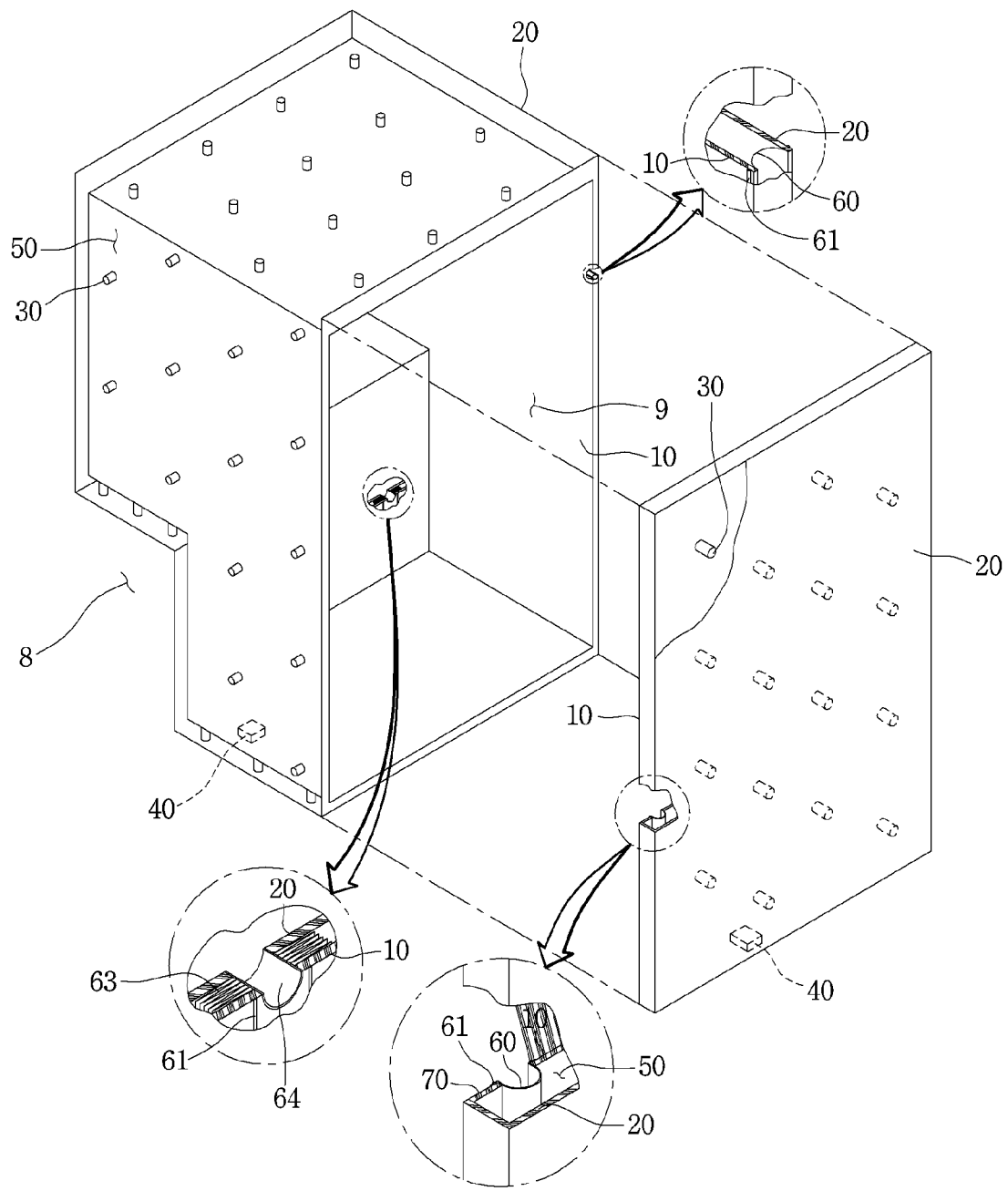
FIG. 2 is a view schematically showing a vacuum adiabatic body used in a main body and a door of the refrigerator.

FIG. 2 is a view schematically showing a vacuum adiabatic body used in the main body and the door of the refrigerator. In FIG. 2, a main body-side vacuum adiabatic body is illustrated in a state in which top and side walls are removed, and a door-side vacuum adiabatic body is illustrated in a state in which a portion of a front wall is removed. In addition, sections of portions at conductive resistance sheets are provided are schematically illustrated for convenience of understanding.

Referring to FIG. 2, the vacuum adiabatic body includes a first plate member 10 (or first plate) for providing a wall of a low-temperature space, a second plate member 20 (or second plate) for providing a wall of a high-temperature space, a vacuum space part 50 defined as a gap part between the first and second plate members 10 and 20. Also, the vacuum adiabatic body includes the conductive resistance sheets 60 and 63 for preventing heat conduction between the first and second plate members 10 and 20. A sealing part 61 for sealing the first and second plate members 10 and 20 is provided such that the vacuum space part 50 is in a sealing state. When the vacuum adiabatic body is applied to a refrigerating or heating cabinet, the first plate member 10 may be referred to as an inner case, and the second plate member 20 may be referred to as an outer case. A machine chamber 8 in which parts providing a freezing cycle are accommodated is placed at a lower rear side of the main body-side vacuum adiabatic body, and an exhaust port 40 for forming a vacuum state by exhausting air in the vacuum space part 50 is provided at any one side of the vacuum adiabatic body. In addition, a pipeline 64 passing through the vacuum space part 50 may be further installed so as to install a defrosting water line and electric lines.

The first plate member 10 may define at least one portion of a wall for a first space provided thereto. The second plate member 20 may define at least one portion of a wall for a second space provided thereto. The first space and the second space may be defined as spaces having different temperatures. Here, the wall for each space may serve as not only a wall directly contacting the space but also a wall not contacting the space. For example, the vacuum adiabatic body of the embodiment may also be applied to a product further having a separate wall contacting each space.

Factors of heat transfer, which cause loss of the adiabatic effect of the vacuum adiabatic body, are heat conduction between the first and second plate members 10 and 20, heat radiation between the first and second plate members 10 and 20, and gas conduction of the vacuum space part 50.

Hereinafter, a heat resistance unit provided to reduce adiabatic loss related to the factors of the heat transfer will be provided. Meanwhile, the vacuum adiabatic body and the refrigerator of the embodiment do not exclude that another adiabatic means is further provided to at least one side of the vacuum adiabatic body. Therefore, an adiabatic means using foaming or the like may be further provided to another side of the vacuum adiabatic body.

Figure 3:
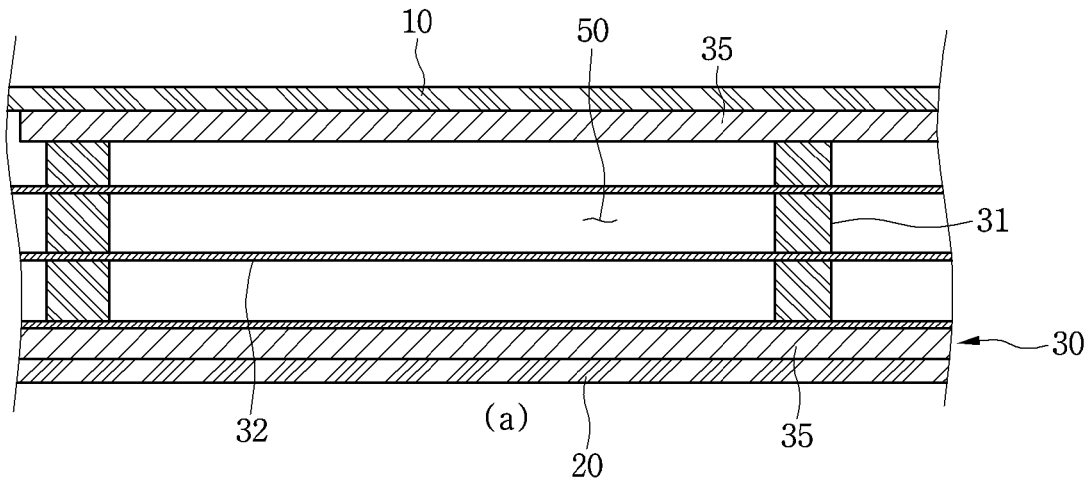
FIG. 3 is a view showing various embodiments of an internal configuration of a vacuum space part.
Figure 3:
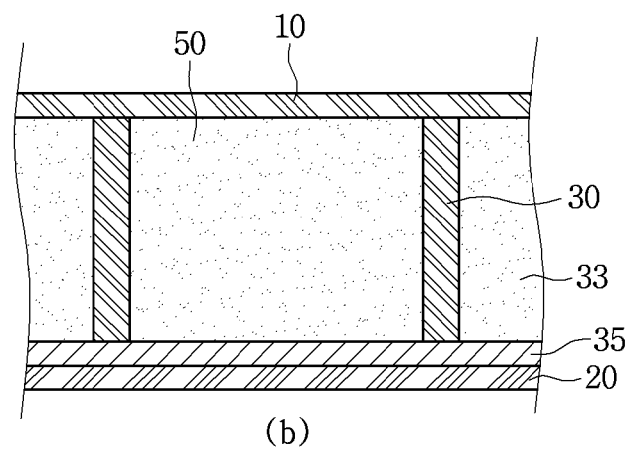
Figure 3:
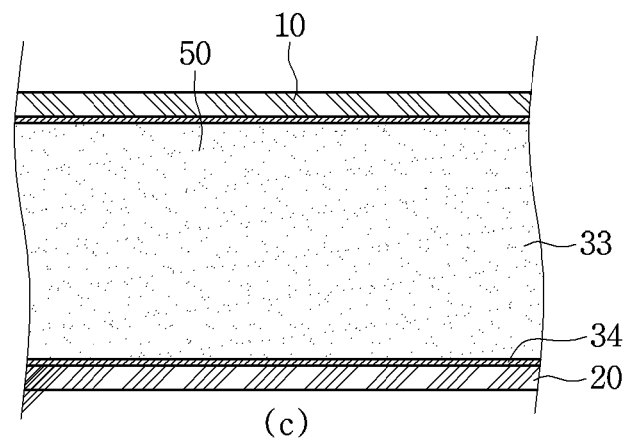

FIG. 3 is a view showing various embodiments of an internal configuration of the vacuum space part.

First, referring to FIG. 3a, the vacuum space part 50 is provided in a third space having a different pressure from the first and second spaces, preferably, a vacuum state, thereby reducing adiabatic loss. The third space may be provided at a temperature between the temperature of the first space and the temperature of the second space. Since the third space is provided as a space in the vacuum state, the first and second plate members 10 and 20 receive a force contracting in a direction in which they approach each other due to a force corresponding to a pressure difference between the first and second spaces. Therefore, the vacuum space part 50 may be deformed in a direction in which it is reduced. In this case, adiabatic loss may be caused due to an increase in amount of heat radiation, caused by the contraction of the vacuum space part 50, and an increase in amount of heat conduction, caused by contact between the plate members 10 and 20.

A supporting unit 30 may be provided to reduce the deformation of the vacuum space part 50. The supporting unit 30 includes bars 31. The bars 31 may extend in a direction substantially vertical to the first and second plate members 10 and 20 so as to support a distance between the first and second plate members 10 and 20. A support plate 35 may be additionally provided to at least one end of the bar 31. The support plate 35 connects at least two bars 31 to each other, and may extend in a direction horizontal to the first and second plate members 10 and 20. The support plate 35 may be provided in a plate shape, or may be provided in a lattice shape such that its area contacting the first or second plate member 10 or 20 is decreased, thereby reducing heat transfer. The bars 31 and the support plate 35 are fixed to each other at least one portion, to be inserted together between the first and second plate members 10 and 20. The support plate 35 contacts at least one of the first and second plate members 10 and 20, thereby preventing deformation of the first and second plate members 10 and 20. In addition, based on the extending direction of the bars 31, a total sectional area of the support plate 35 is provided to be greater than that of the bars 31, so that heat transferred through the bars 31 can be diffused through the support plate 35.

A material of the supporting unit 30 may include a resin selected from the group consisting of PC, glass fiber PC, low outgassing PC, PPS, and LCP so as to obtain high compressive strength, low outgassing and water absorptance, low thermal conductivity, high compressive strength at high temperature, and excellent machinability.

A radiation resistance sheet 32 for reducing heat radiation between the first and second plate members 10 and 20 through the vacuum space part 50 will be described. The first and second plate members 10 and 20 may be made of a stainless material capable of preventing corrosion and providing a sufficient strength. The stainless material has a relatively high emissivity of 0.16, and hence a large amount of radiation heat may be transferred. In addition, the supporting unit 30 made of the resin has a lower emissivity than the plate members, and is not entirely provided to inner surfaces of the first and second plate members 10 and 20. Hence, the supporting unit 30 does not have great influence on radiation heat. Therefore, the radiation resistance sheet 32 may be provided in a plate shape over a majority of the area of the vacuum space part 50 so as to concentrate on reduction of radiation heat transferred between the first and second plate members 10 and 20. A product having a low emissivity may be preferably used as the material of the radiation resistance sheet 32. In an embodiment, an aluminum foil having an emissivity of 0.02 may be used as the radiation resistance sheet 32. Since the transfer of radiation heat cannot be sufficiently blocked using one radiation resistance sheet, at least two radiation resistance sheets 32 may be provided at a certain distance so as not to contact each other. In addition, at least one radiation resistance sheet may be provided in a state in which it contacts the inner surface of the first or second plate member 10 or 20.

Referring to FIG. 3b, the distance between the plate members is maintained by the supporting unit 30, and a porous substance 33 may be filled in the vacuum space part 50. The porous substance 33 may have a higher emissivity than the stainless material of the first and second plate members 10 and 20. However, since the porous substance 33 is filled in the vacuum space part 50, the porous substance 33 has a high efficiency for resisting the radiation heat transfer.

In this embodiment, the vacuum adiabatic body can be fabricated without using the radiation resistance sheet 32.

Referring to FIG. 3c, the supporting unit 30 maintaining the vacuum space part 50 is not provided. Instead of the supporting unit 30, the porous substance 33 is provided in a state in which it is surrounded by a film 34. In this case, the porous substance 33 may be provided in a state in which it is compressed so as to maintain the gap of the vacuum space part 50. The film 34 is made of, for example, a PE material, and may be provided in a state in which holes are formed therein.

In this embodiment, the vacuum adiabatic body can be fabricated without using the supporting unit 30. In other words, the porous substance 33 can simultaneously serve as the radiation resistance sheet 32 and the supporting unit 30.

A case where the porous substance 33 is filled in the vacuum space part 50 will be described in detail later.

Figure 4:
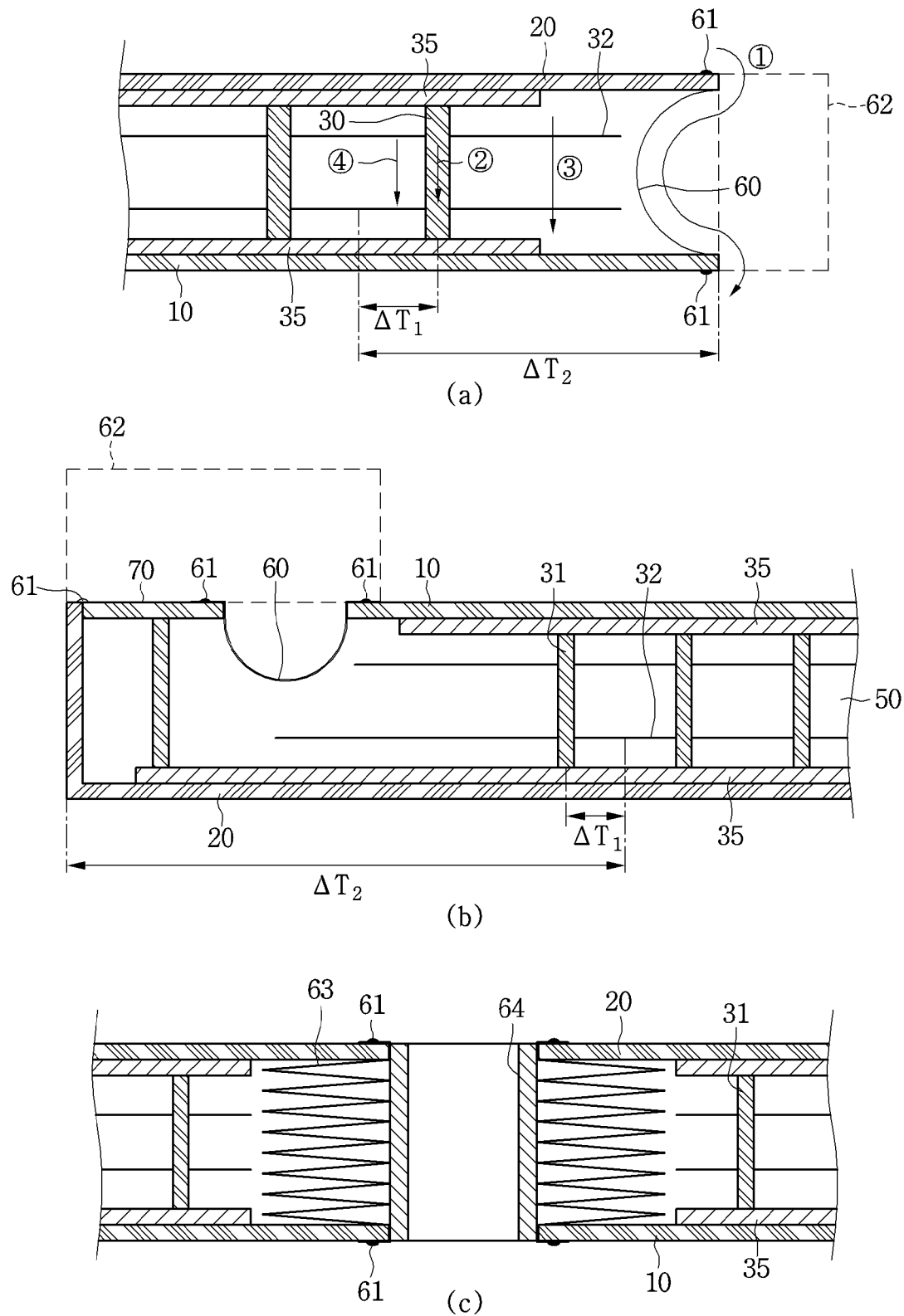
FIG. 4 is a view showing various embodiments of conductive resistance sheets and peripheral portions thereof.

FIG. 4 is a view showing various embodiments of the conductive resistance sheets and peripheral portions thereof. Structures of the conductive resistance sheets are briefly illustrated in FIG. 2, but will be understood in detail with reference to FIG. 4.

First, a conductive resistance sheet proposed in FIG. 4a may be preferably applied to the main body-side vacuum adiabatic body. Specifically, the first and second plate members 10 and 20 are to be sealed so as to vacuum the interior of the vacuum adiabatic body. In this case, since the two plate members have different temperatures from each other, heat transfer may occur between the two plate members. A conductive resistance sheet 60 is provided to prevent heat conduction between two different kinds of plate members.

The conductive resistance sheet 60 may be provided with sealing parts 61 at which both ends of the conductive resistance sheet 60 are sealed to define at least one portion of the wall for the third space and maintain the vacuum state. The conductive resistance sheet 60 may be provided as a thin foil in unit of micrometer so as to reduce the amount of heat conducted along the wall for the third space. The sealing parts may be provided as welding parts. That is, the conductive resistance sheet 60 and the plate members 10 and 20 may be fused to each other. In order to cause a fusing action between the conductive resistance sheet 60 and the plate members 10 and 20, the conductive resistance sheet 60 and the plate members 10 and 20 may be made of the same material, and a stainless material may be used as the material. The sealing parts 61 are not limited to the welding parts, and may be provided through a process such as cocking. The conductive resistance sheet 60 may be provided in a curved shape. Thus, a heat conduction distance of the conductive resistance sheet 60 is provided longer than the linear distance of each plate member, so that the amount of heat conduction can be further reduced.

A change in temperature occurs along the conductive resistance sheet 60. Therefore, in order to block heat transfer to the exterior of the conductive resistance sheet 60, a shielding part 62 may be provided at the exterior of the conductive resistance sheet 60 such that an adiabatic action occurs. In other words, in the refrigerator, the second plate member 20 has a high temperature and the first plate member 10 has a low temperature. In addition, heat conduction from high temperature to low temperature occurs in the conductive resistance sheet 60, and hence the temperature of the conductive resistance sheet 60 is suddenly changed. Therefore, when the conductive resistance sheet 60 is opened to the exterior thereof, heat transfer through the opened place may seriously occur. So as to reduce heat loss, the shielding part 62 is provided at the exterior of the conductive resistance sheet 60. For example, when the conductive resistance sheet 60 is exposed to any one of the low-temperature space and the high-temperature space, the conductive resistance sheet 60 does not serve as a conductive resistor as well as the exposed portion thereof, which is not preferable.

The shielding part 62 may be provided as a porous substance contacting an outer surface of the conductive resistance sheet 60. The shielding part 62 may be provided as an adiabatic structure, e.g., a separate gasket, which is placed at the exterior of the conductive resistance sheet 60. The shielding part 62 may be provided as a portion of the vacuum adiabatic body, which is provided at a position facing a corresponding conductive resistance sheet 60 when the main body-side vacuum adiabatic body is closed with respect to the door-side vacuum adiabatic body. In order to reduce heat loss even when the main body and the door are opened, the shielding part 62 may be preferably provided as a porous substance or a separate adiabatic structure.

A conductive resistance sheet proposed in FIG. 4b may be preferably applied to the door-side vacuum adiabatic body. In FIG. 4b, portions different from those of FIG. 4a are described in detail, and the same description is applied to portions identical to those of FIG. 4a. A side frame 70 is further provided at an outside of the conductive resistance sheet 60. A part for sealing between the door and the main body, an exhaust port necessary for an exhaust process, a getter port for vacuum maintenance, and the like may be placed on the side frame 70. This is because the mounting of parts is convenient in the main body-side vacuum adiabatic body, but the mounting positions of parts are limited in the door-side vacuum adiabatic body.

In the door-side vacuum adiabatic body, it is difficult to place the conductive resistance sheet 60 at a front end portion of the vacuum space part, i.e., a corner side part of the vacuum space part. This is because, unlike the main body, a corner edge portion of the door is exposed to the exterior. More specifically, if the conductive resistance sheet 60 is placed at the front end portion of the vacuum space part, the corner edge portion of the door is exposed to the exterior, and hence there is a disadvantage in that a separate adiabatic part should be configured so as to heat-insulate the conductive resistance sheet 60.

A conductive resistance sheet proposed in FIG. 4c may be preferably installed in the pipeline passing through the vacuum space part. In FIG. 4c, portions different from those of FIGS. 4a and 4b are described in detail, and the same description is applied to portions identical to those of FIGS. 4a and 4b. A conductive resistance sheet having the same shape as that of FIG. 4a, preferably, a wrinkled conductive resistance sheet 63 may be provided at a peripheral portion of the pipeline 64. Accordingly, a heat transfer path can be lengthened, and deformation caused by a pressure difference can be prevented. In addition, a separate shielding part may be provided to improve the adiabatic performance of the conductive resistance sheet.

A heat transfer path between the first and second plate members 10 and 20 will be described with reference back to FIG. 4a. Heat passing through the vacuum adiabatic body may be divided into surface conduction heat ① conducted along a surface of the vacuum adiabatic body, more specifically, the conductive resistance sheet 60, supporter conduction heat ② conducted along the supporting unit 30 provided inside the vacuum adiabatic body, gas conduction heat ③ conducted through an internal gas in the vacuum space part, and radiation transfer heat ④ transferred through the vacuum space part.

The transfer heat may be changed depending on various design dimensions. For example, the supporting unit may be changed such that the first and second plate members 10 and 20 can endure a vacuum pressure without being deformed, the vacuum pressure may be changed, the distance between the plate members may be changed, and the length of the conductive resistance sheet may be changed. The transfer heat may be changed depending on a difference in temperature between the spaces (the first and second spaces) respectively provided by the plate members. In the embodiment, a preferred configuration of the vacuum adiabatic body has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as 19.6 mW/mK.

By performing a relative analysis on heat transfer amounts of the vacuum adiabatic body of the embodiment, a heat transfer amount by the gas conduction heat ③ can become smallest. For example, the heat transfer amount by the gas conduction heat ③ may be controlled to be equal to or smaller than 4% of the total heat transfer amount. A heat transfer amount by solid conduction heat defined as a sum of the surface conduction heat ① and the supporter conduction heat ② is largest. For example, the heat transfer amount by the solid conduction heat may reach 75% of the total heat transfer amount. A heat transfer amount by the radiation transfer heat ④ is smaller than the heat transfer amount by the solid conduction heat but larger than the heat transfer amount of the gas conduction heat ③. For example, the heat transfer amount by the radiation transfer heat ④ may occupy about 20% of the total heat transfer amount.

According to such a heat transfer distribution, effective heat transfer coefficients (eK: effective K) (W/mK) of the surface conduction heat ①, the supporter conduction heat ②), the gas conduction heat ③, and the radiation transfer heat ④ may have an order of Math FIG. 1.

$$eK_{solid\ conduction\ heat} > eK_{radiation\ transfer\ heat} > eK_{gas\ conduction\ heat}$$

Math Figure 1

Here, the effective heat transfer coefficient (eK) is a value that can be measured using a shape and temperature differences of a target product. The effective heat transfer coefficient (eK) is a value that can be obtained by measuring a total heat transfer amount and a temperature at least one portion at which heat is transferred. For example, a calorific value (W) is measured using a heating source that can be quantitatively measured in the refrigerator, a temperature distribution (K) of the door is measured using heats respectively transferred through a main body and an edge of the door of the refrigerator, and a path through which heat is transferred is calculated as a conversion value (m), thereby evaluating an effective heat transfer coefficient.

The effective heat transfer coefficient (eK) of the entire vacuum adiabatic body is a value given by $k=QL/A\Delta T$. Here, Q denotes a calorific value (W) and may be obtained using a calorific value of a heater. A denotes a sectional area (m2) of the vacuum adiabatic body, L denotes a thickness (m) of the vacuum adiabatic body, and $\Delta T$ denotes a temperature difference.

For the surface conduction heat, a conductive calorific value may be obtained through a temperature difference ($\Delta T$) between an entrance and an exit of the conductive resistance sheet 60 or 63, a sectional area (A) of the conductive resistance sheet, a length (L) of the conductive resistance sheet, and a thermal conductivity (k) of the conductive resistance sheet (the thermal conductivity of the conductive resistance sheet is a material property of a material and can be obtained in advance). For the supporter conduction heat, a conductive calorific value may be obtained through a temperature difference ($\Delta T$) between an entrance and an exit of the supporting unit 30, a sectional area (A) of the supporting unit, a length (L) of the supporting unit, and a thermal conductivity (k) of the supporting unit. Here, the thermal conductivity of the supporting unit is a material property of a material and can be obtained in advance. The sum of the gas conduction heat ③, and the radiation transfer heat ④ may be obtained by subtracting the surface conduction heat and the supporter conduction heat from the heat transfer amount of the entire vacuum adiabatic body. A ratio of the gas conduction heat ③, and the radiation transfer heat ④ may be obtained by evaluating radiation transfer heat when no gas conduction heat exists by remarkably lowering a vacuum degree of the vacuum space part 50.

When a porous substance is provided inside the vacuum space part 50, porous substance conduction heat ⑤ may be a sum of the supporter conduction heat ② and the radiation transfer heat ④. The porous substance conduction heat ⑤ may be changed depending on various variables including a kind, an amount, and the like of the porous substance.

According to an embodiment, a temperature difference $\Delta T1$ between a geometric center formed by adjacent bars 31 and a point at which each of the bars 31 is located may be preferably provided to be less than 0.5° C. Also, a temperature difference $\Delta T2$ between the geometric center formed by the adjacent bars 31 and an edge portion of the vacuum adiabatic body may be preferably provided to be less than 0.5° C. In the second plate member 20, a temperature difference between an average temperature of the second plate and a temperature at a point at which a heat transfer path passing through the conductive resistance sheet 60 or 63 meets the second plate may be largest. For example, when the second space is a region hotter than the first space, the temperature at the point at which the heat transfer path passing through the conductive resistance sheet meets the second plate member becomes lowest. Similarly, when the second space is a region colder than the first space, the temperature at the point at which the heat transfer path passing through the conductive resistance sheet meets the second plate member becomes highest.

This means that the amount of heat transferred through other points except the surface conduction heat passing through the conductive resistance sheet should be controlled, and the entire heat transfer amount satisfying the vacuum adiabatic body can be achieved only when the surface conduction heat occupies the largest heat transfer amount. To this end, a temperature variation of the conductive resistance sheet may be controlled to be larger than that of the plate member.

Physical characteristics of the parts constituting the vacuum adiabatic body will be described. In the vacuum adiabatic body, a force by vacuum pressure is applied to all of the parts. Therefore, a material having a strength (N/m2) of a certain level may be preferably used.

Under such circumstances, the plate members 10 and 20 and the side frame 70 may be preferably made of a material having a sufficient strength with which they are not damaged by even vacuum pressure. For example, when the number of bars 31 is decreased so as to limit the support conduction heat, deformation of the plate member occurs due to the vacuum pressure, which may bad influence on the external appearance of refrigerator. The radiation resistance sheet 32 may be preferably made of a material that has a low emissivity and can be easily subjected to thin film processing. Also, the radiation resistance sheet 32 is to ensure a strength enough not to be deformed by an external impact. The supporting unit 30 is provided with a strength enough to support the force by the vacuum pressure and endure an external impact, and is to have machinability. The conductive resistance sheet 60 may be preferably made of a material that has a thin plate shape and can endure the vacuum pressure.

In an embodiment, the plate member, the side frame, and the conductive resistance sheet may be made of stainless materials having the same strength. The radiation resistance sheet may be made of aluminum having a weaker strength that the stainless materials. The supporting unit may be made of resin having a weaker strength than the aluminum.

Unlike the strength from the point of view of materials, analysis from the point of view of stiffness is required. The stiffness (N/m) is a property that would not be easily deformed. Although the same material is used, its stiffness may be changed depending on its shape. The conductive resistance sheets 60 or 63 may be made of a material having a strength, but the stiffness of the material is preferably low so as to increase heat resistance and minimize radiation heat as the conductive resistance sheet is uniformly spread without any roughness when the vacuum pressure is applied. The radiation resistance sheet 32 requires a stiffness of a certain level so as not to contact another part due to deformation. Particularly, an edge portion of the radiation resistance sheet may generate conduction heat due to drooping caused by the self-load of the radiation resistance sheet. Therefore, a stiffness of a certain level is required. The supporting unit 30 requires a stiffness enough to endure a compressive stress from the plate member and an external impact.

In an embodiment, the plate member and the side frame may preferably have the highest stiffness so as to prevent deformation caused by the vacuum pressure. The supporting unit, particularly, the bar may preferably have the second highest stiffness. The radiation resistance sheet may preferably have a stiffness that is lower than that of the supporting unit but higher than that of the conductive resistance sheet. The conductive resistance sheet may be preferably made of a material that is easily deformed by the vacuum pressure and has the lowest stiffness.

Even when the porous substance 33 is filled in the vacuum space part 50, the conductive resistance sheet may preferably have the lowest stiffness, and the plate member and the side frame may preferably have the highest stiffness.

Hereinafter, a vacuum pressure preferably determined depending on an internal state of the vacuum adiabatic body. As already described above, a vacuum pressure is to be maintained inside the vacuum adiabatic body so as to reduce heat transfer. At this time, it will be easily expected that the vacuum pressure is preferably maintained as low as possible so as to reduce the heat transfer.

The vacuum space part may resist the heat transfer by applying only the supporting unit 30. Alternatively, the porous substance 33 may be filled together with the supporting unit in the vacuum space part 50 to resist the heat transfer. Alternatively, the vacuum space part may resist the heat transfer not by applying the supporting unit but by applying the porous substance 33.

The case where only the supporting unit is applied will be described.

Figure 5:
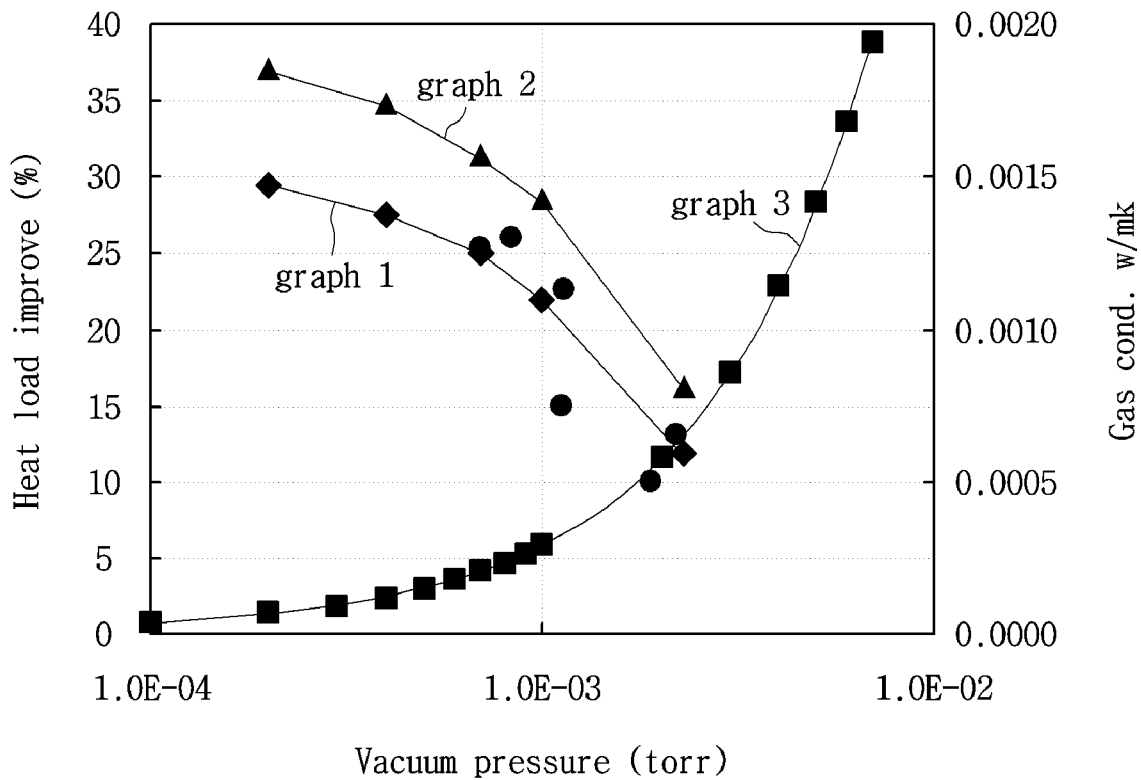
FIG. 5 illustrates graphs showing changes in adiabatic performance and changes in gas conductivity with respect to vacuum pressures by applying a simulation.

FIG. 5 illustrates graphs showing changes in adiabatic performance and changes in gas conductivity with respect to vacuum pressures by applying a simulation.

Referring to FIG. 5, it can be seen that, as the vacuum pressure is decreased, i.e., as the vacuum degree is increased, a heat load in the case of only the main body (Graph 1) or in the case where the main body and the door are joined together (Graph 2) is decreased as compared with that in the case of the typical product formed by foaming polyurethane, thereby improving the adiabatic performance. However, it can be seen that the degree of improvement of the adiabatic performance is gradually lowered. Also, it can be seen that, as the vacuum pressure is decreased, the gas conductivity (Graph 3) is decreased. However, it can be seen that, although the vacuum pressure is decreased, the ratio at which the adiabatic performance and the gas conductivity are improved is gradually lowered. Therefore, it is preferable that the vacuum pressure is decreased as low as possible. However, it takes long time to obtain excessive vacuum pressure, and much cost is consumed due to excessive use of a getter. In the embodiment, an optimal vacuum pressure is proposed from the above-described point of view.

Figure 6:
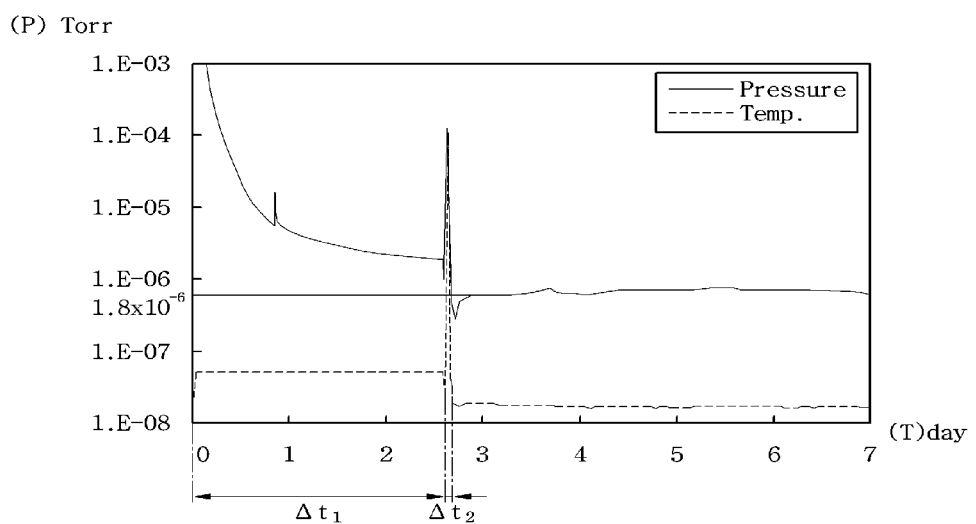
FIG. 6 illustrates graphs obtained by observing, over time and pressure, a process of exhausting the interior of the vacuum adiabatic body when a supporting unit is used.

FIG. 6 illustrates graphs obtained by observing, over time and pressure, a process of exhausting the interior of the vacuum adiabatic body when the supporting unit is used.

Referring to FIG. 6, in order to create the vacuum space part 50 to be in the vacuum state, a gas in the vacuum space part 50 is exhausted by a vacuum pump while evaporating a latent gas remaining in the parts of the vacuum space part 50 through baking. However, if the vacuum pressure reaches a certain level or more, there exists a point at which the level of the vacuum pressure is not increased any more ($\Delta t1$). After that, the getter is activated by disconnecting the vacuum space part 50 from the vacuum pump and applying heat to the vacuum space part 50 ($\Delta t2$). If the getter is activated, the pressure in the vacuum space part 50 is decreased for a certain period of time, but then normalized to maintain a vacuum pressure of a certain level. The vacuum pressure that maintains the certain level after the activation of the getter is approximately $1.8 \times 10^{-6}$ Torr.

In the embodiment, a point at which the vacuum pressure is not substantially decreased any more even though the gas is exhausted by operating the vacuum pump is set to the lowest limit of the vacuum pressure used in the vacuum adiabatic body, thereby setting the minimum internal pressure of the vacuum space part 50 to $1.8 \times 10^{-6}$ Torr.

Figure 7:
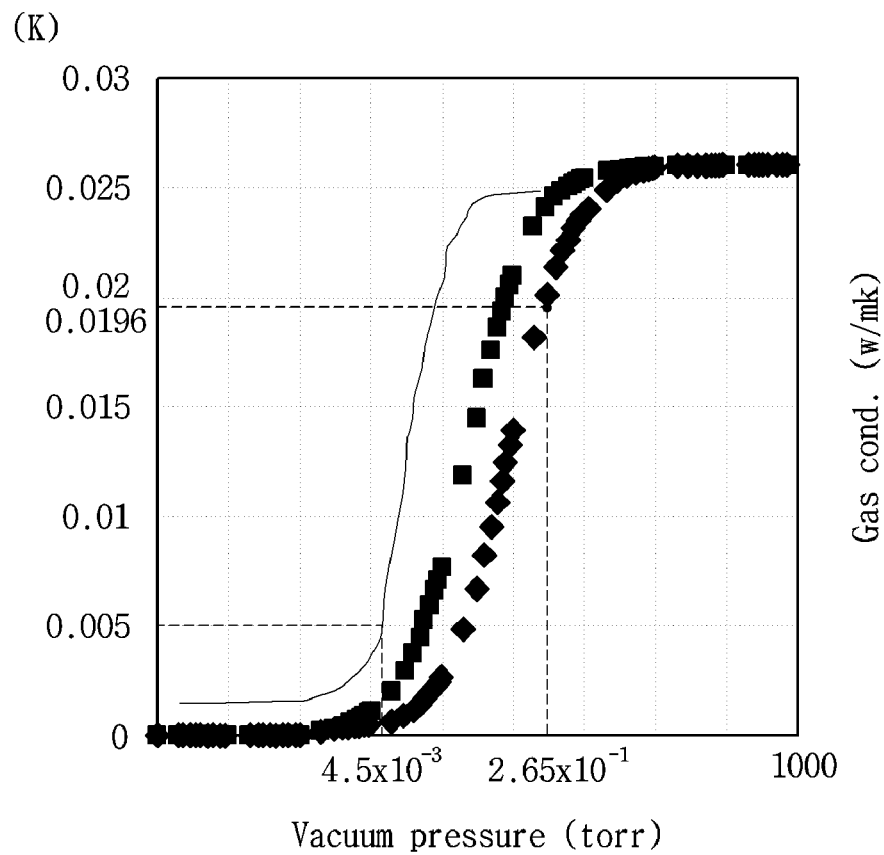
FIG. 7 illustrates graphs obtained by comparing vacuum pressures and gas conductivities.

FIG. 7 illustrates graphs obtained by comparing vacuum pressures and gas conductivities.

Referring to FIG. 7, gas conductivities with respect to vacuum pressures depending on sizes of a gap in the vacuum space part 50 are represented as graphs of effective heat transfer coefficients (eK). Effective heat transfer coefficients (eK) were measured when the gap in the vacuum space part 50 has three sizes of 2.76 mm, 6.5 mm, and 12.5 mm. The gap in the vacuum space part 50 is defined as follows. When the radiation resistance sheet 32 exists inside vacuum space part 50, the gap is a distance between the radiation resistance sheet 32 and the plate member adjacent thereto. When the radiation resistance sheet 32 does not exist inside vacuum space part 50, the gap is a distance between the first and second plate members.

It can be seen that, since the size of the gap is small at a point corresponding to a typical effective heat transfer coefficient of 0.0196 W/mK, which is provided to an adiabatic material formed by foaming polyurethane, the vacuum pressure is $2.65 \times 10^{-1}$ Torr even when the size of the gap is 2.76 mm. Meanwhile, it can be seen that the point at which reduction in adiabatic effect caused by gas conduction heat is saturated even though the vacuum pressure is decreased is a point at which the vacuum pressure is approximately $4.5 \times 10^{-3}$ Torr. The vacuum pressure of $4.5 \times 10^{-3}$ Torr can be defined as the point at which the reduction in adiabatic effect caused by gas conduction heat is saturated. Also, when the effective heat transfer coefficient is 0.1 W/mK, the vacuum pressure is $1.2 \times 10^{-2}$ Torr.

When the vacuum space part 50 is not provided with the supporting unit but provided with the porous substance, the size of the gap ranges from a few micrometers to a few hundreds of micrometers. In this case, the amount of radiation heat transfer is small due to the porous substance even when the vacuum pressure is relatively high, i.e., when the vacuum degree is low. Therefore, an appropriate vacuum pump is used to adjust the vacuum pressure. The vacuum pressure appropriate to the corresponding vacuum pump is approximately $2.0 \times 10^{-4}$ Torr. Also, the vacuum pressure at the point at which the reduction in adiabatic effect caused by gas conduction heat is saturated is approximately $4.7 \times 10^{-2}$ Torr. Also, the pressure where the reduction in adiabatic effect caused by gas conduction heat reaches the typical effective heat transfer coefficient of 0.0196 W/mK is 730 Torr.

In a case where the supporting unit and the porous material are provided together in the vacuum space part, an intermediate vacuum pressure between a case of using only the supporting unit and a case of using only the porous material may be used. In a case where only the porous material is used, the lowest vacuum pressure can be created and used.

Figure 8:
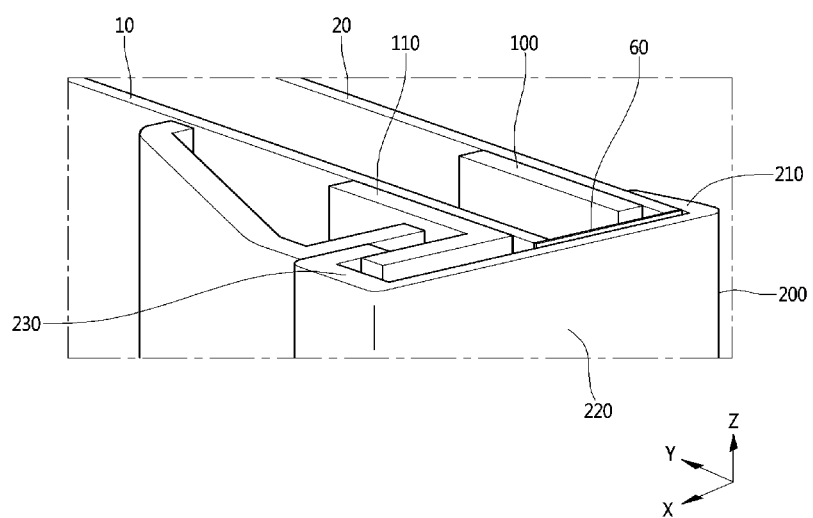
FIG. 8 is a sectional perspective view illustrating the peripheral portion of the vacuum adiabatic body.

FIG. 8 is a sectional perspective view illustrating a peripheral portion of the vacuum adiabatic body.

Referring to FIG. 8, a first plate member 10, a second plate member 20, and a conductive resistance sheet 60 are provided. The conductive resistance sheet 60 may be provided as a thin plate to resist thermal conduction between the plate members 10 and 20. The conductive resistance sheet 60 is provided as a thin plate in a flat surface in the drawing but may have a curved shape by being drawn inward when vacuum is applied to the vacuum space part 50.

Since the conductive resistance sheet 60 is in the form of a thin plate and has low strength, it can be broken even by a small external impact. When the conductive resistance sheet 60 is broken, the vacuum of the vacuum space part is destroyed and the performance of the vacuum adiabatic body cannot be exerted. So as to solve this problem, a sealing frame 200 may be provided on the outer surface of the conductive resistance sheet 60. According to the sealing frame 200, since the parts of the door 3 or other external products are in indirect contact with each other through the sealing frame 200 without directly contacting the conductive resistance sheet 60, the breakage of the conductive resistance sheet 60 can be prevented. In order that the sealing frame 200 does not transfer an impact to the conductive resistance sheet 60, the gap between the two members may be spaced from each other and a buffer member may be interposed therebetween.

So as to reinforce the strength of the vacuum adiabatic body, the plate members 10 and 20 may be provided with a reinforcing member. For example, the reinforcing member may include a first reinforcing member 100 fastened to a peripheral portion of the second plate member 20 and a second reinforcing member 110 fastened to a peripheral portion of the first plate member 10. The reinforcing members 100 and 110 may be thicker or have a higher strength than the plate members 10 and 20 to such an extent that the strength of the vacuum adiabatic body can be increased. The first reinforcing member 100 may be provided in the inner space of the vacuum space part 50 and the second reinforcing member 110 may be provided on the inner surface part of the main body 2.

It is preferable that the conductive resistance sheet 60 does not contact the reinforcing members 100 and 110. This is because the thermal conductive resistance characteristic generated in the conductive resistance sheet 60 is destroyed by the reinforcing member. In other words, this is because the width of the narrow heat bridge for resisting the heat conduction is greatly expanded by the reinforcing member, and the narrow heat bridge characteristic is destroyed.

Since the width of the inner space of the vacuum space part 50 is narrow, the first reinforcing member 100 may be provided in a flat plate shape in section. The second reinforcing member 110 provided on the inner surface of the main body 2 may be provided in a bent shape in section.

The sealing frame 200 may include an inner surface part 230 which is placed in an inner space of the main body 2 and supported by the first plate member 10, an outer surface part 210 which is placed on an outer space of the main body 2 and supported by the second plate member 20, and a side surface part 220 which is placed on a side surface of a peripheral portion of the vacuum adiabatic body constituting the main body 2, covers the conductive resistance sheet 60, and connects the inner surface part 230 and the outer surface part 210 to each other.

The sealing frame 200 may be made of a resin that permits slight deformation. The mounting position of the sealing frame 200 can be maintained by an interaction, that is, a catching action, between the inner surface part 230 and the outer surface part 210. In other words, the setting position may not deviate.

The position fixing of the sealing frame 200 will be described in detail.

First, the movement of the plate members 10 and 20 in the extending direction on the flat surface (y-axis direction in FIG. 8) can be fixed by the inner surface part 230 being engaged and supported to the second reinforcing member 110. More specifically, the position movement of the sealing frame 200 which is pulled out from the vacuum adiabatic body to the outside may cause the inner surface part 230 to be interrupted by being engaged to the second reinforcing member 110. Conversely, a position movement that the sealing frame 200 moves to the inside of the vacuum adiabatic body can be interrupted by any one of firstly, an action of the inner surface part 230 being engaged and supported to the second reinforcing member 110 (this action can act in both directions including the elastic restoring force of the sealing frame made of resin), secondly, an action of the side surface part 220 being stopped with respect to the plate members 10 and 20, and thirdly, an action of the inner surface part 230 stopping movement with respect to the first plate member 10 in the y-axis direction.

The movement of the sealing frame in an extending direction perpendicular to the end surface of the plate members 10 and 20 (x-axis direction in FIG. 8) can be fixed by the outer surface part 210 being engaged and supported to the second plate member 20. As the auxiliary action, the movement of the sealing frame in the x-axis direction may be interrupted by the action of the inner surface part 230 holding and contacting the second reinforcing member 110.

The movement of the sealing frame 200 in the extending direction (z-axis direction in FIG. 8) can be stopped by at least one of a first action of the inner surface part 230 of any one of the sealing frames 200 contacting the inner surface part 230 of the adjacent other sealing frame 200 and a second action of the inner surface part 230 of any one of the sealing frames 200 contacting the mullion 300.

Figure 9:
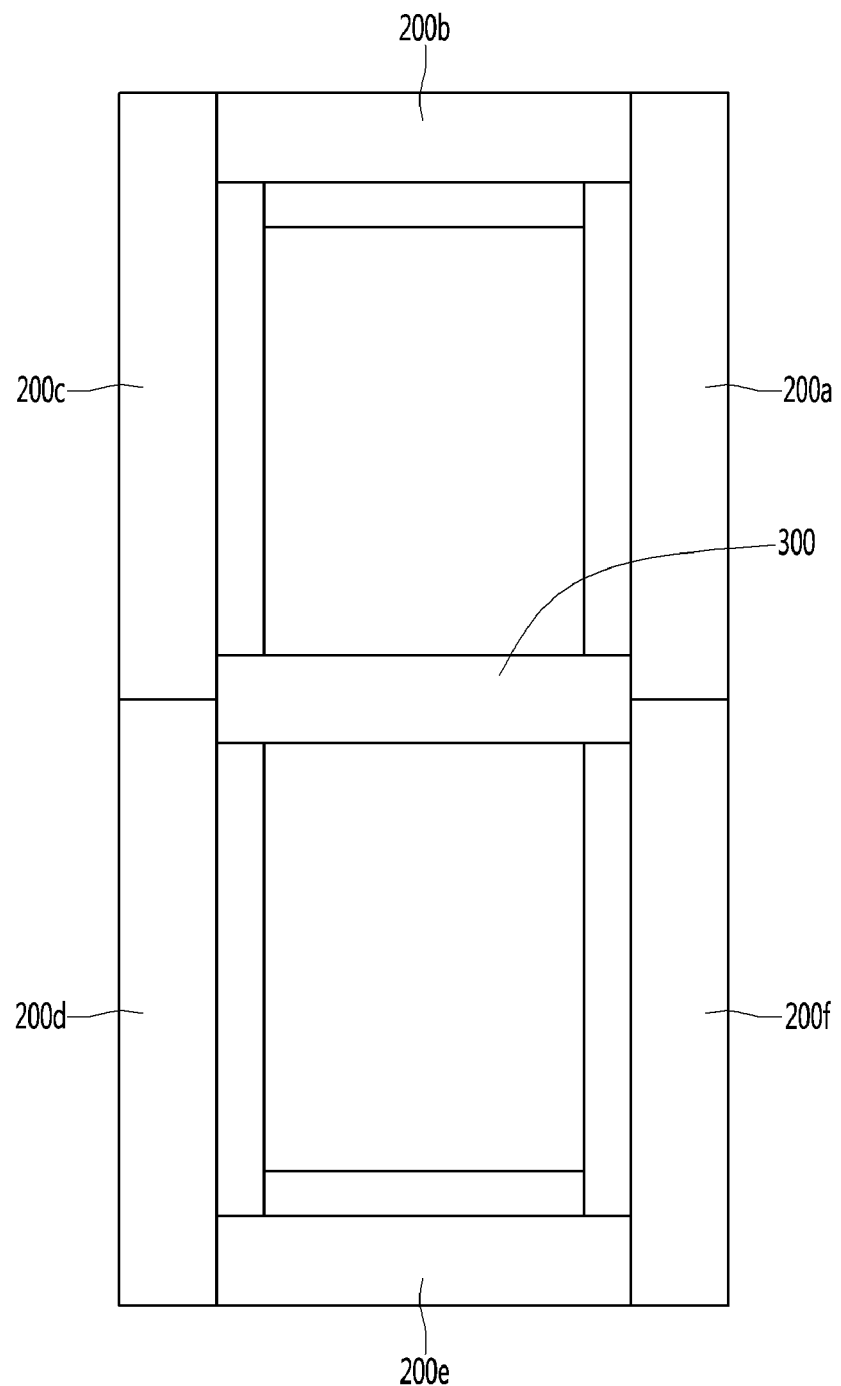
FIGS. 9 and 10 is a view schematically illustrating a front surface of the main body in a virtual state in which the inner surface part is unfolded.
Figure 10:
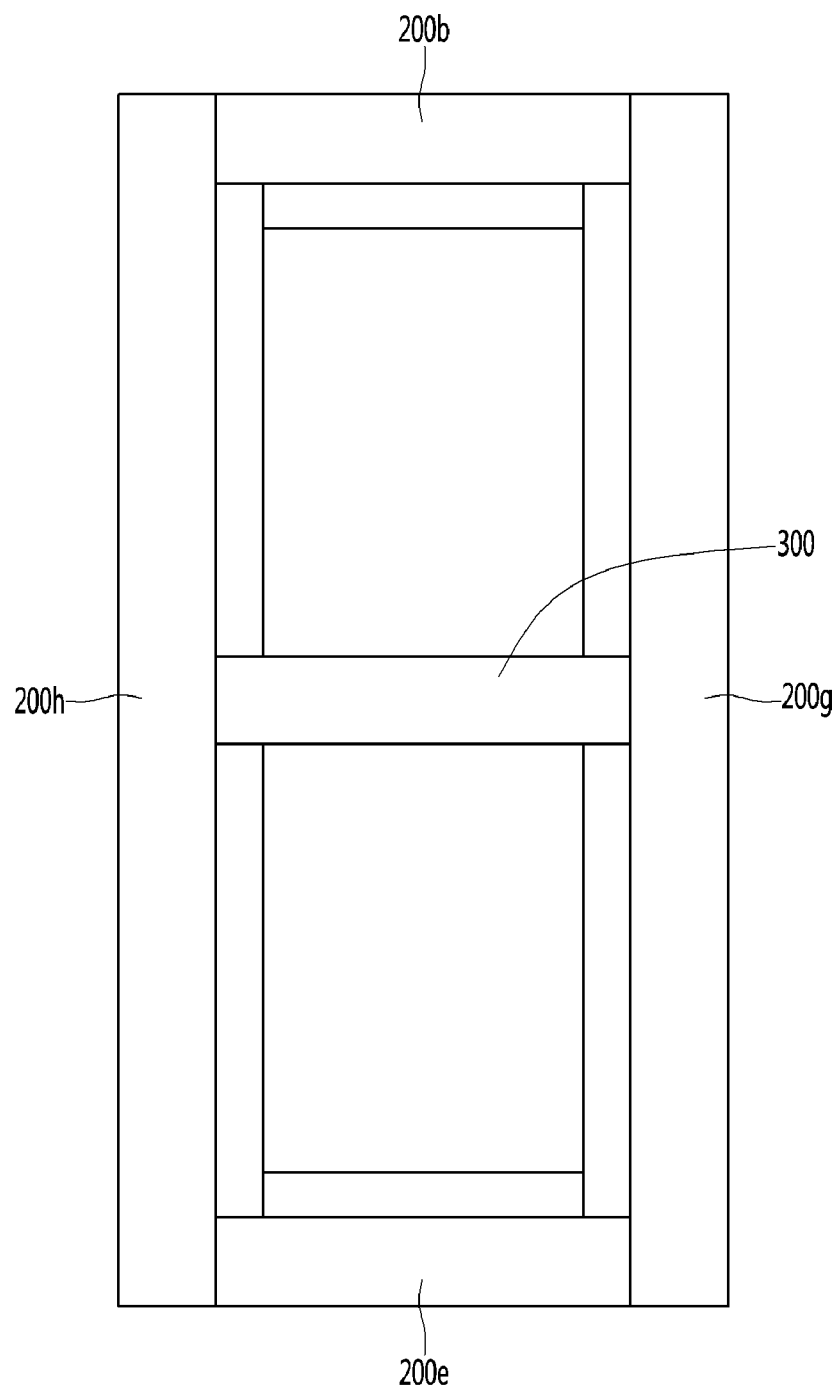

FIGS. 9 and 10 are views schematically illustrating the front surface of the main body. In the drawing, it should be noted that the sealing frame 200 is in a state of being in a virtual state in which the inner surface part 230 is extended in a direction parallel to the side surface part 220.

Referring to FIGS. 9 and 10, the sealing frame 200 may include members 200b and 200e sealing the upper and lower peripheral portions of the main body 2, respectively. The side peripheral portion of the main body 2 can be divided according to whether the space inside the refrigerator divided based on the mullion 300 is separated (in a case of FIG. 9) or integrally (in a case of FIG. 10) sealed.

In a case where the side peripheral portion of the main body 2 is sealed by being separated as illustrated in FIG. 9, the side peripheral portion of the main body 2 can be divided into four sealing frames 200a, 200c, 200d, and 200f. In a case where the side peripheral portion of the main body 2 is integrally sealed as illustrated in FIG. 10, the side peripheral portion of the main body 2 can be divided into two sealing frames 200g and 200c.

In a case where the side peripheral portion of the main body 2 are sealed by the two sealing frames 200g and 200c as illustrated in FIG. 10, since the two fastening operations are required, the manufacturing is facilitated. However, since there is a risk of loss of cool air due to heat transfer between the storage housings separated by the thermal conduction of the sealing frame, there is a need to cope with this.

In a case where the side peripheral portion of the main body 2 are sealed by the four sealing frames 200a, 200c, 200d, and 200f as illustrated in FIG. 9, it is inconvenient to manufacture since four fastening operations are required, but heat conduction between the sealing frames is interrupted, and heat transfer between the separated storage housings is reduced, thereby reducing the loss of cool air.

Meanwhile, the embodiment of the vacuum adiabatic body illustrated in FIG. 8 can preferably exemplify the main body-side vacuum adiabatic body. However, it does not exclude that the sealing frame is provided to the door-side vacuum adiabatic body. However, in general, since the gasket is provided on the door 3, it is more preferable that the sealing frame 200 is provided on the main body-side vacuum adiabatic body. In this case, the side surface part 220 of the sealing frame 200 can have a further advantage that it can provide a sufficient width for the gasket to contact.

In detail, the width of the side portion 220 is wider than the adiabatic thickness of the vacuum adiabatic body, that is, the width of the vacuum adiabatic body, so that the adiabatic width of the gasket can be provided sufficiently wide. For example, in a case where the adiabatic thickness of the vacuum adiabatic body is 10 mm, it is possible to provide a large storage space inside the refrigerator, thereby increasing the accommodation space of the refrigerator. However, there is a problem that 10 mm does not provide a sufficient gap with which the gasket is in contact. In this case, since the side surface part 220 can provide a wide gap corresponding to the contact area of the gasket, it is possible to effectively prevent cold loss through the contact gap between the main body 2 and the door 3. In other words, in a case where the contact width of the gasket is 20 mm, the width of the side surface part 220 can be 20 mm or more in correspondence with the contact width of the gasket, even if the adiabatic thickness of the vacuum adiabatic body is 10 mm.

Meanwhile, air may be filled in the adiabatic space of the gasket. The air in the adiabatic space may have a higher thermal conductivity than a space in a vacuum state.

In addition, so as to secure a sufficient adiabatic performance by the gasket, the maximum value of the length of the gasket in the horizontal direction with respect to the surface on which the gasket is seated on the sealing frame is provided to be larger than the average value of the gap between the first plate member and the second plate member constituting the third space. According to this configuration, the adiabatic action in the third space can be performed by the gasket, thereby increasing the thermal efficiency of the refrigerator.

It can be understood that the sealing frame 200 performs the function of sealing to shield the conductive resistance sheet and to prevent loss of cold air.

Figure 11:
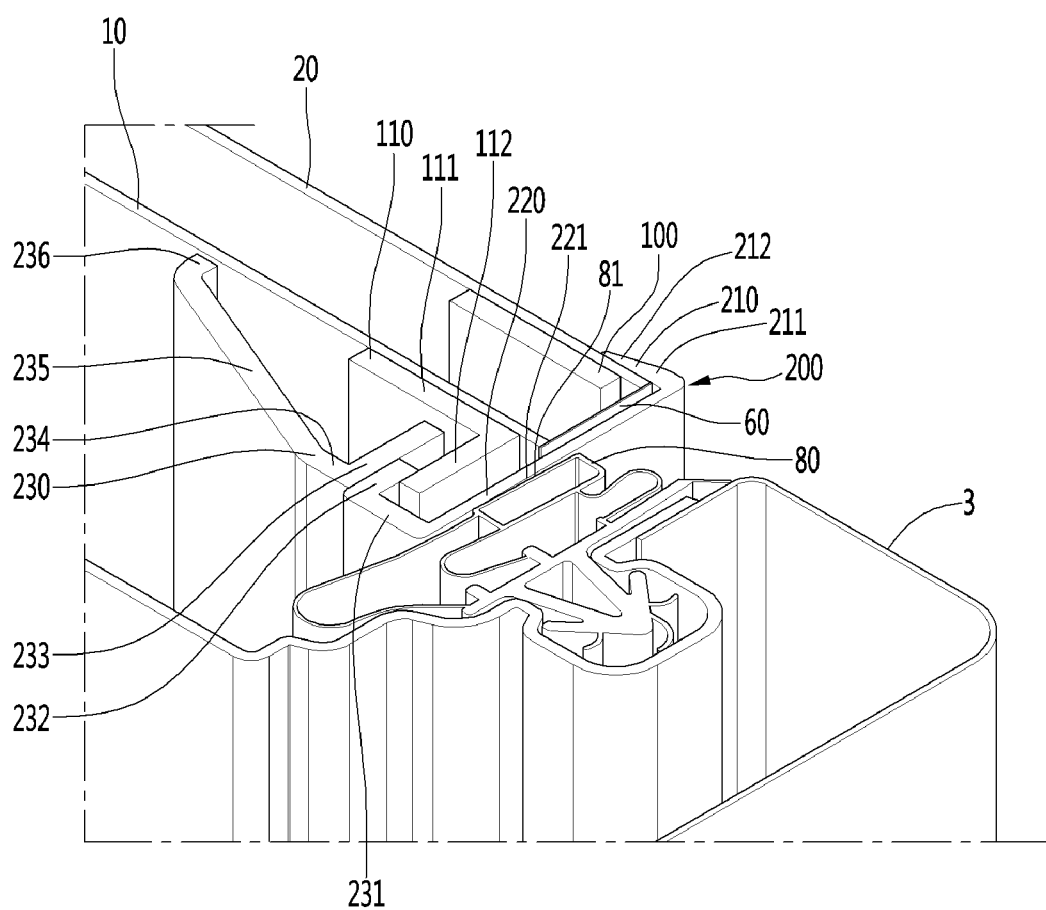
FIG. 11 is a sectional view illustrating the contact part illustrated in a state of where the main body is closed by the door.

FIG. 11 is a sectional view of the contact part illustrated in a state where the main body is closed by the door.

Referring to FIG. 11, the gasket 80 is interposed between the main body 2 and the door 3. The gasket 80 can be fastened to the door 3 and can be provided as a deformable member as a flexible material. When the gasket 80 includes a magnet as one part and the magnet approaches the magnetic body (that is, magnetic body of main body peripheral portion) by pulling the magnetic body, the contact surface between the main body 2 and the door 3 can block the leakage of the cold air in the refrigerator by the sealing surface having a predetermined width, by the action of the gasket 80 smoothly deforming.

Specifically, when the gasket sealing surface 81 of the gasket is in contact with the side surface part 220, the side surface part sealing surface 221 having a sufficient width can be provided. The side surface part sealing surface 221 may be defined as a contact surface on the side surface part 220 which is correspondingly in surface contact with the gasket sealing surface 81 when the gasket 80 contacts the side surface 220.

Accordingly, it is possible to secure sealing surfaces 81 and 221 having a sufficient area regardless of the adiabatic thickness of the vacuum adiabatic body. This is because even if the adiabatic thickness of the vacuum adiabatic body is narrow, for example, even if the adiabatic thickness of the vacuum adiabatic body is narrower than the gasket sealing surface 81, if the width of the side surface part 220 is increased, a side surface part sealing surface 221 having a sufficient width can be obtained. In addition, regardless of the deformation of the member which may affect the deformation of the contact surface between the main body and the door, the sealing surfaces 81 and 221 having a sufficient area can be secured. This is because it is possible to provide a predetermined clearance in and out of the side surface part sealing surface 221 in designing the side surface part 220 so that even if slight deformation occurs between the sealing surfaces 81 and 221, the width and area of the sealing surface can be maintained.

In the sealing frame 200, the outer surface part 210, the side surface part 220, and the inner surface part 230 are provided so that the set position thereof can be maintained. Simply, the outer surface part 210 and the inner surface part 230 has a shape of being narrowed, that is, a structure of a concave groove, so that the outer surface part 210 and the inner surface part 230 can be provided as a configuration for engaging the end part of the vacuum adiabatic body, more precisely, the plate members 10 and 20. Here, it can be understood that the concave groove has a configuration of the concave groove as a configuration in which the width of the end parts between the outer surface part 210 and the inner surface part 230 is smaller than the width of the side surface part 220.

The fastening of the sealing frame 200 will be briefly described. Firstly, the side surface part 220 and the outer surface part 210 is rotated in a direction of the second plate member 20 in a state where the inner surface 230 is engaged to the second reinforcing member 110. Then, the sealing frame 200 is elastically deformed, and the outer surface part 210 moves inward along the outer surface of the second plate member 20 so that the fastening can be completed. When the fastening of the sealing frame 200 is completed, the sealing frame 200 can be restored to the original shape thereof designed before the deformation. When the fastening is completed, the installing position can be maintained as described above.

The detailed configuration and detailed action of the sealing frame 200 will be described.

The outer surface part 210 may include an extension part 211 outside the refrigerator extending inward from an end of the second plate member 20 and a contact part 212 outside the refrigerator which is in contact with the outer surface of the second plate member 20 at the end of the extension part 211 outside the refrigerator.

The extension part 211 outside the refrigerator has a predetermined length so as to have a predetermined length so as to prevent the outer surface part 210 from being pulled out due to weak external force. In other words, the outer surface part 210 is not completely pulled out from the second plate member 20 even if the outer surface part 210 is forced by the user's carelessness to be pulled toward the door. However, if the extension part 211 outside the refrigerator is excessively long, since there is difficulty in intentional removal at the time of repair and the fastening operation becomes difficult, it is preferable that the length is limited to a predetermined length.

The contact part 212 outside the refrigerator may be provided with a structure in which the end of the extension part 211 outside the refrigerator is slightly bent toward the outer surface of the second plate member 20. Accordingly, sealing by the contact between the outer surface part 210 and the second plate member 20 becomes perfect, so that foreign matters can be prevented from being introduced.

The side surface part 220 is bent at an angle of about 90 degrees from the outer surface part 210 toward the opening of the main body 2 and provided with a width enough to secure a sufficient width of the side surface part sealing surface 221. The side surface part 220 may be provided to be thinner than the inner surface part 210 and the outer surface part 230. This can have a purpose of permitting elastic deformation at the time of fastening or removing the sealing frame 200 and the purpose of not permitting a distance to cause a magnetic force between the magnet installed on the gasket 80 and the main body-side magnetic body to be weakened. The side surface part 220 may have a purpose of protecting the conductive resistance sheet 60 and arranging the outer appearance as an exposed portion of the exterior. In a case where the adiabatic member is laid inside the side surface part 220, the adiabatic performance of the conductive resistance sheet 60 may be reinforced.

The inner surface part 230 is bent about 90 degrees and extends in a direction inside the refrigerator, that is, the rear surface direction of the main body. The inner surface part 230 can perform an action of fixing the sealing frame 200, an action of installing parts necessary for the operation of a product to which a vacuum adiabatic body is installed such as a refrigerator, and an action of preventing an inflow of external foreign matters.

The action corresponding to each configuration of the inner surface part 230 will be described.

The inner surface part 230 is provided with an extension part 231 inside the refrigerator which is bent and extends from an inner end part of the side surface part 220, and a first member fastening part 232 which is bent from the inner end part of the extension part 231 inside the refrigerator in the outer direction, that is, toward the inner surface of the plate member 10. The first member fastening part 232 may be in contact with and engaged to the protrusion part 112 of the second reinforcing member 110. The extension part 231 inside the refrigerator may provide a gap that extends toward the inside of the refrigerator so that the first member fastening portion 232 is engaged inside the second reinforcement member 110.

The supporting action of the sealing frame 200 is drawn by the first member fastening part 232 being engaged to the second reinforcing member 110. The second reinforcement member 110 may further include a base part 111 which is fastened to the first plate member 10 and a protrusion part 112 which is bent and extends from the base part 111. The inertia moment of the second reinforcing member 110 is increased by the structure of the base part 111 and the protrusion part 112 so that the ability to resist the bending strength can be increased.

The second member fastening part 233 may be fastened to the first member fastening part 232. The first and second member fastening parts 232 and 233 may be provided as separate members to be fastened to each other and may be provided as a single member from the design stage.

A gap forming part 234 which further extends from the inner end portion of the second member fastening part 233 to the inside of the refrigerator may be further provided. The gap forming part 234 may serve as a portion for providing a gap or a space where parts necessary for the operation of the appliance such as a refrigerator provided with the vacuum adiabatic body are placed.

Meanwhile, the length of the side surface part 220 is set to be larger than the distance between the pair of the plate members 10 and 20 so that the gap forming part 234 can secure a predetermined space in which the part is accommodated. In addition, even if the width of the third space differs depending on the position of the vacuum adiabatic body, the length of the side surface part 220 may be provided to be greater than the average value of the gap between the pair of plate members 10 and 20.

Furthermore, the length of the side surface part 220 may be provided to be greater than the width of the conductive resistance sheet.

An inclined portion 235 inside the refrigerator is further provided inside the gap forming part 234. The inclined portion 235 inside the refrigerator may be inclined to approach the first plate member 10 side toward the end, that is, toward the inside of the refrigerator. The gap between the sealing frame and the first plate member is provided to be reduced as the inclined portion 235 inside the refrigerator is directed inwardly so that the volume of the sealing frame 200 occupying the space inside the refrigerator is reduced as much as possible, and it is possible to expect an effect of securing a space in which a part such as a lamp is mounted by cooperation with the gap forming part 234.

A contact part 236 inside the refrigerator is provided at the inner end part of the inclined portion 235 inside the refrigerator. The contact part 236 inside the refrigerator may be provided in a structure in which the end of the inclined portion 235 inside the refrigerator is slightly bent toward the inner surface side of the first plate member 10. Accordingly, sealing by the contact between the inner surface part 230 and the first plate member 10 becomes perfect, so that foreign matters can be prevented from being introduced.

In a case where an accessory part such as a lamp is installed on the inner surface part 230, the inner surface part 230 may be divided into two parts so as to achieve the purpose of convenience of installation of the part. For example, the inner surface part 230 may be divided into a first member which provides the extension part 231 inside the refrigerator and the first member fastening part 232 and a second member which provides the second member fastening part 233, the gap forming part 234, the inclined part 235 inside the refrigerator, and the contact part 236 inside the refrigerator. The first member and the second member can be fastened to each other in such a manner that the second member fastening part 233 is fastened to the first member fastening part 232 in a state where a product such as a lamp is mounted on the second member. Of course, it does not exclude that the inner surface part 230 is provided in more various manners. For example, the inner surface part 230 may be provided as a single member.

Figure 12:
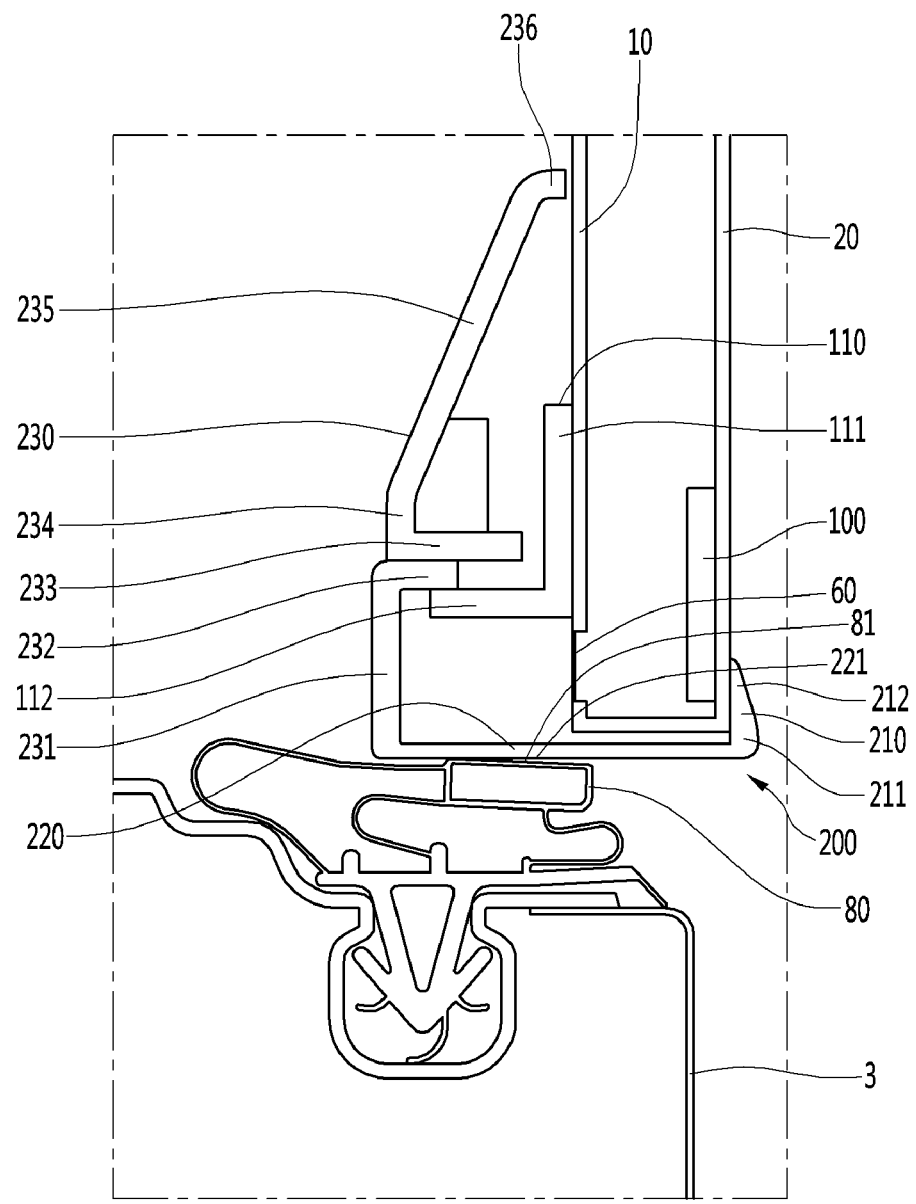
FIG. 12 is a sectional view of a contact part of a main body and a door according to another embodiment.

FIG. 12 is a sectional view illustrating a contact part of the main body and the door according to another embodiment. The present embodiment is characteristically different in the position of the conductive resistance sheet and accordingly, the change of the other portions.

Referring to FIG. 12, in this embodiment, the conductive resistance sheet 60 may be provided on the side inside the refrigerator rather than on the end peripheral portion of the vacuum adiabatic body. The second plate member 20 may extend beyond the side outside the refrigerator and the peripheral portion of the vacuum adiabatic body. In some cases, the second plate member 20 may extend by a certain length to the side inside the refrigerator. In a case of this embodiment, it can be seen that a conductive resistance sheet can be provided at a position similar to the conductive resistance sheet of the door-side vacuum adiabatic body illustrated in FIG. 4b.

In this case, it is preferable that the second reinforcing member 110 is moved to the inside of the refrigerator without contacting the conductive resistance sheet 60 so as to avoid adversely affecting the high thermal conductive adiabatic performance of the conductive resistance sheet 60. The function of the heat bridge of the conductive resistance sheet is achieved. Accordingly, the conductive resistance sheet 60 and the second reinforcing member 110 are not in contact with each other, and the conductive adiabatic performance by the conductive resistance sheet and the strength reinforcement performance of the vacuum adiabatic body by the reinforcing member can be achieved at the same time.

This embodiment can be applied to a case where perfect thermal protection and physical protection against the peripheral portion of the vacuum adiabatic body are required.

Figure 13:
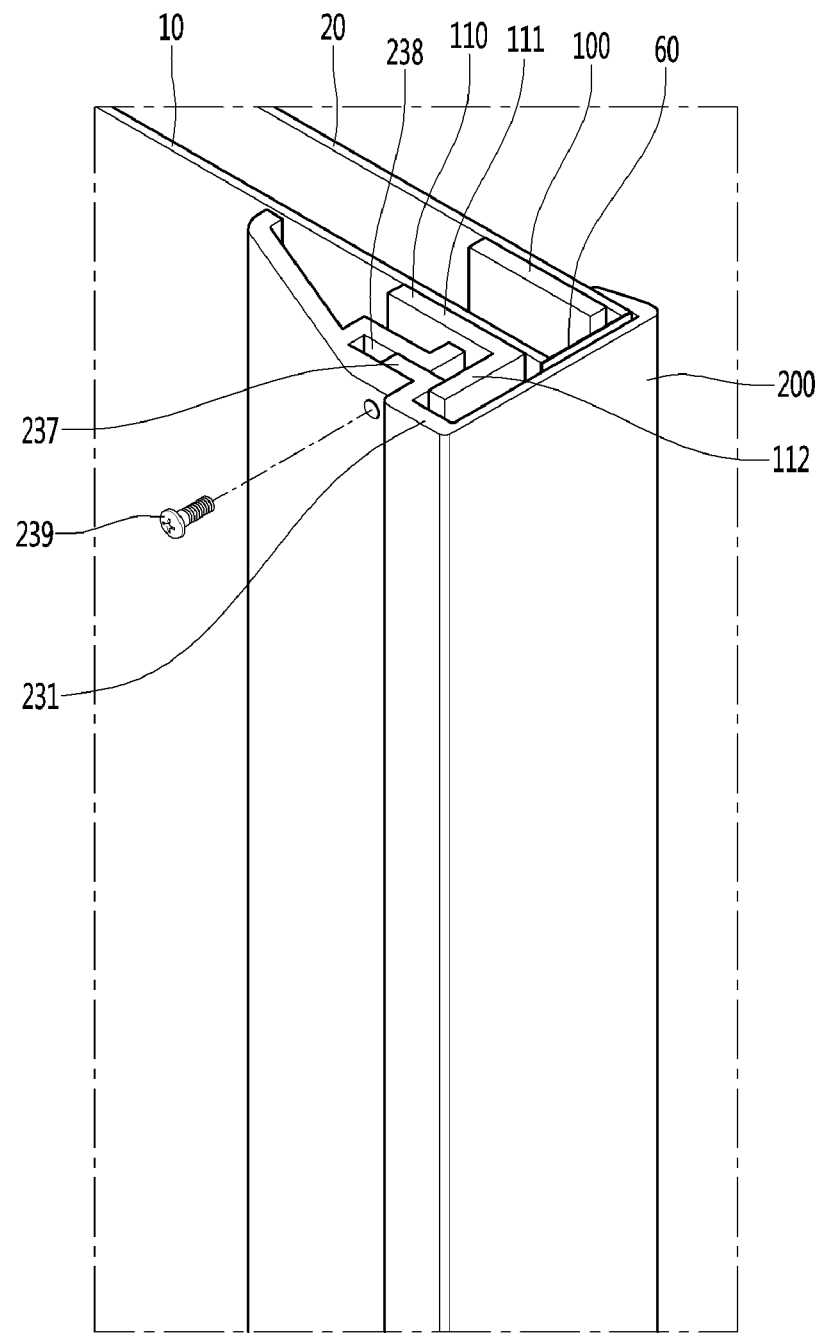
FIG. 13 and FIG. 14 are partial cutaway perspective views of an inner surface part.
Figure 14:
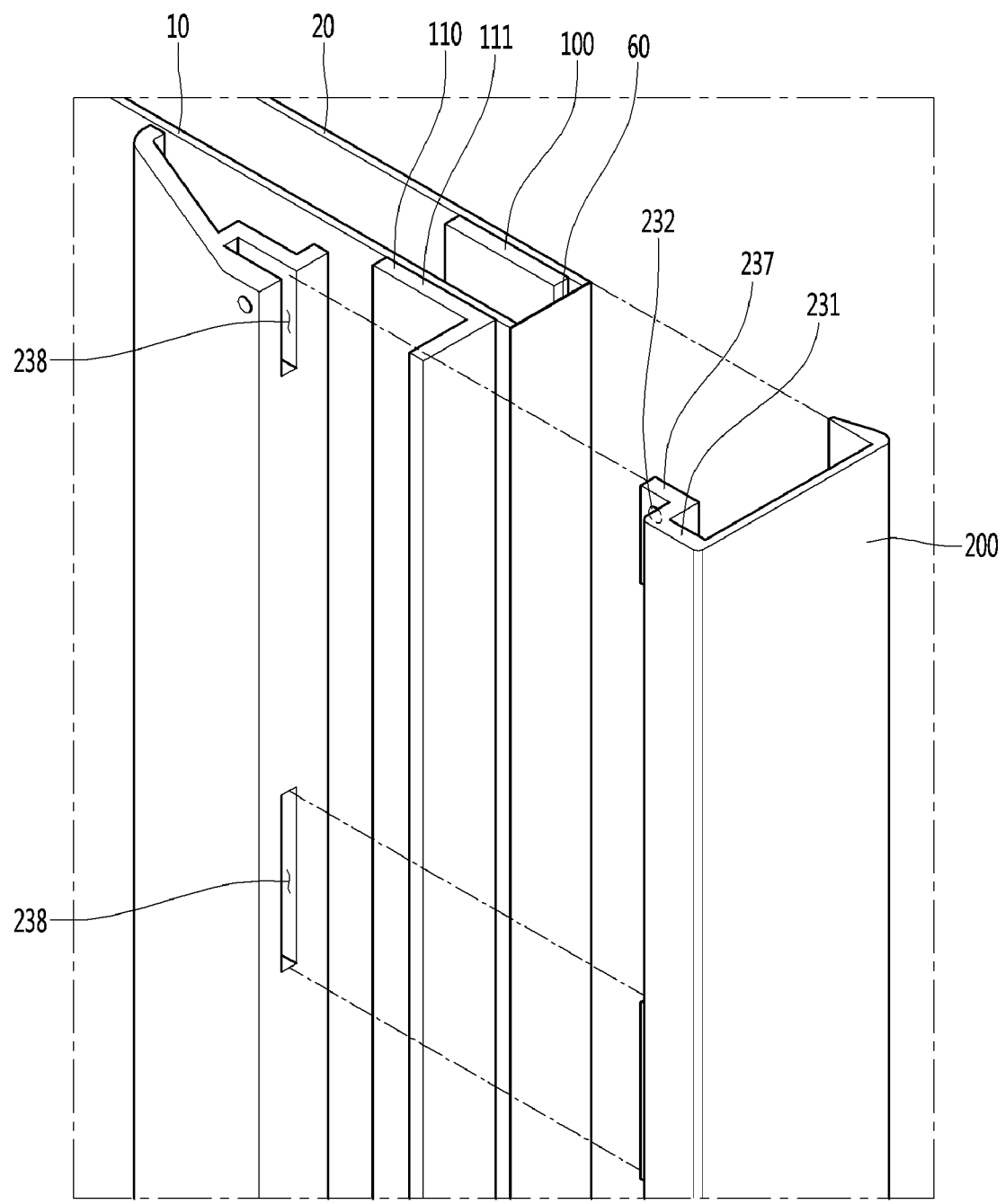

FIGS. 13 and 14 are partial cutaway perspective views illustrating the fastening of two members in the embodiment in which the inner surface part is divided into two members, FIG. 13 is a view illustrating a state where fastening is completed, and FIG. 14 is a view illustrating the fastening process.

Referring to FIGS. 13 and 14, the first member fastening part 232 is engaged with the projection part 112 of the second reinforcing member 110 and the outer surface part 210 is supported by the second plate member 20. Accordingly, the sealing frame 200 can be fixed to the peripheral portion of the vacuum adiabatic body.

At least one first member insertion part 237 which is bent and extends in an inner direction of the refrigerator may be provided on the end part of the first member fastening part 232, preferably, for each sealing frame 200 which is installed in the refrigerator. A second member insertion recess 238 may be provided at a position corresponding to the first member insertion part 237. The first member insertion part 237 and the second member insertion recess 238 are similar in size and shape to each other so that the first member insertion part 237 can be inserted into, fitted into, and fixed to the second member insertion recess 238.

The fastening of the first member and the second member will be described. The second member is aligned with respect to the first member so that the second member insertion recess 238 corresponds to the first member insertion part 237 in a state where the first member is fastened to the peripheral portion of the vacuum adiabatic body. By inserting the first member insertion portion 237 into the second member insertion recess 238, the two members can be fastened.

On the other hand, at least a portion of the second member insertion recess 238 may be provided to be smaller than the first member insertion part 237 so as to prevent the engaged second member from falling out of the first member. Thereby, both members can be tightly fitted. So as to perform an action of being engaged and supported after the second member insertion recess 238 and the first member insertion part 237 are inserted to a predetermined depth, at some point after a predetermined depth, the protrusion and the groove can be provided to both members, respectively. In this case, after the two members are inserted at a predetermined depth, the two members may be inserted further beyond the steps so that the fixing of the two members may be performed to be more robust. Of course, the worker feels that the correct insertion has been performed through the light feel.

The two members constituting the inner surface part can be fixed in the position and the coupling relation by the configuration in which the two members are fitted and coupled. Alternatively, in a case where the load is large due to the action of the second member fixing the other part, the first member and the second member are fastened to each other by a separate fastening member such as a fastener 239 inside the refrigerator.

Figure 15:
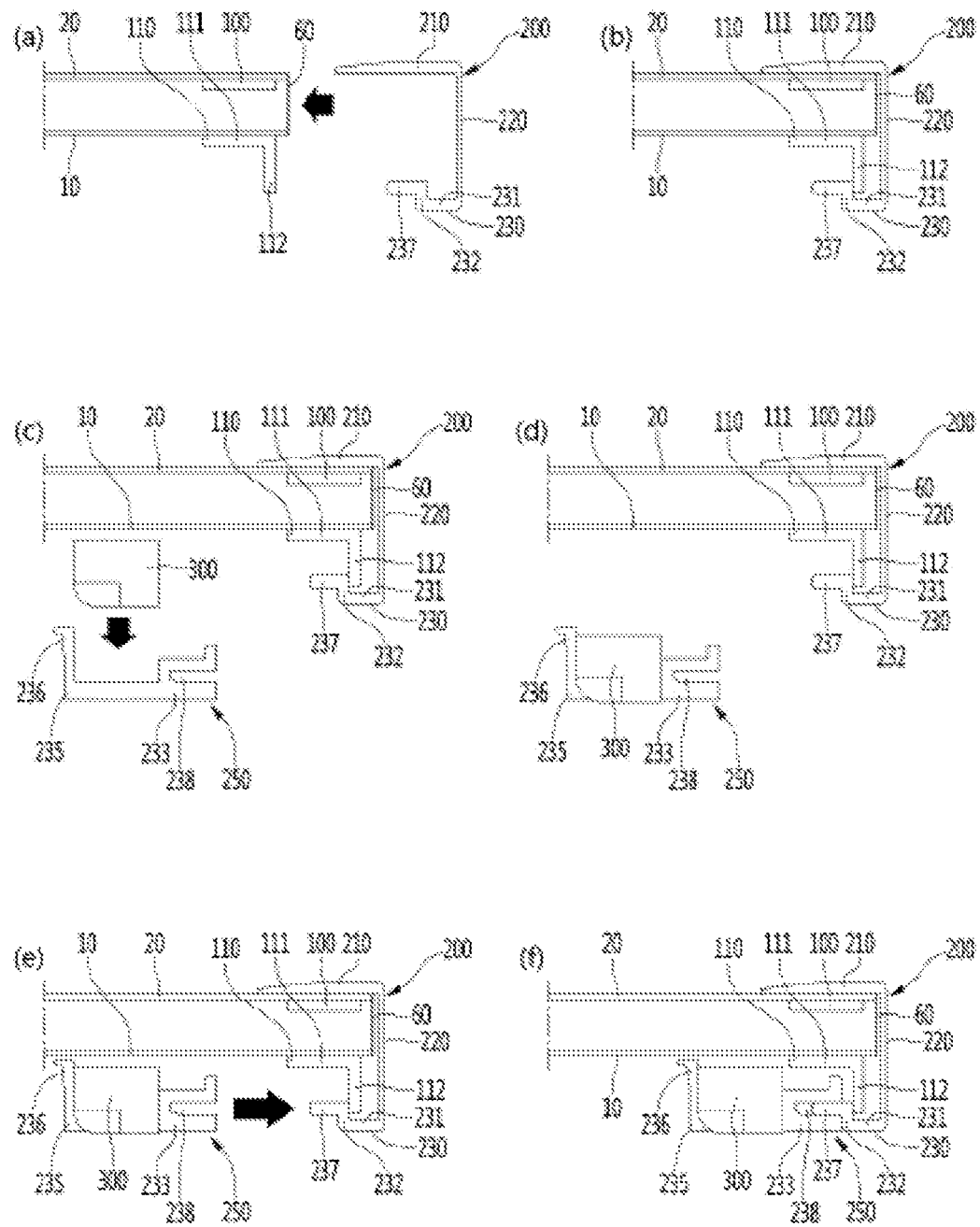
FIG. 15 is a view for sequentially illustrating fastening of a sealing frame in a case of an embodiment in which the sealing frame is provided as two members.

FIG. 15 is a view sequentially illustrating the fastening of the sealing frame in a case of the embodiment in which the sealing frame is provided as two members. Particularly, a case where the part is provided on the inner surface part is exemplified.

Referring to FIG. 15(a), the sealing frame 200 is fastened to the peripheral portion of the vacuum adiabatic body. At this time, the fastening can be performed by using the elastic deformation of the sealing frame 200 and the restoring force according to this without a separate member such as a screw.

For example, in a state where the inner surface part 230 is engaged with the second reinforcing member 110, the connection point between the inner surface part 230 and the side surface part 220 may be used as a rotation center, and the side surface part 220 and the outer surface part 210 are rotated in the direction of the second plate member 20. This action can cause the elastic deformation of the side surface part 220.

Hereinafter, the outer surface part 210 moves inward from the outer surface of the second plate member 20 and the elastic restoring force of the side surface part 220 acts so that the outer surface part 210 can be lightly fastened to the outer surface of the second plate member 20. Once the fastening of the sealing frame 200 is completed, the sealing frame 200 can be seated in an original position thereof designed to the originally designed shape.

Referring to FIG. 15(b), the first member of the sealing frame 200 is illustrated as a state where the fastening of the first member is completed. The side surface part 220 may be formed to be thinner than the outer surface part 210 and the inner surface part 230 so that the sealing frame 200 can be fastened to the peripheral portion of the vacuum adiabatic body by elastic deformation and elastic restoring action of the sealing frame.

Referring to FIG. 15(c), a part seating member 250 is provided as a separate part as a second member that provides the inner surface part 230. The part placing member 250 is a part on which the part 399 is placed so that the set position thereof can be supported, and the additional function necessary for the action of the part 399 can be further performed. For example, in the present embodiment, in a case where the part 399 is a lamp, the gap forming part 234 may be provided on the part seating member 250 as a transparent member. This allows the light emitted from the lamp to pass through the inner surface part 230 and to emit into the inside of the refrigerator and allows the user to identify the product inside the refrigerator.

The part seating member 250 may have a predetermined shape that can be fitted with the part 399 to fix the position of the part 399 so that the part 399 is seated.

FIG. 15(d) illustrates a state where the part 399 is placed on the part seating member 250.

Referring to FIG. 15(e), the part seating member 250 on which the part 399 is seated is aligned in a predetermined direction so as to be fastened to the first member that provides the inner surface part. In the embodiment, the first member fastening part 232 and the second member insertion recess 238 can be aligned to each other in the extending direction so that the first member fastening part 232 can be fitted into the second member insertion recess 238. Of course, although not limited to this way, it may be preferably proposed to enhance the ease of assembly.

The first member fastening part 232 is provided to be slightly larger than the second member insertion recess 238 so that the first member fastening part 232 and the second member insertion recess 238 are tightly fitted and an engaging structure such as a step and a protrusion can be introduced for light insertion.

Referring to FIG. 15(f), the inner surface part in a state where the assembly is completed can be seen.

Figure 16:
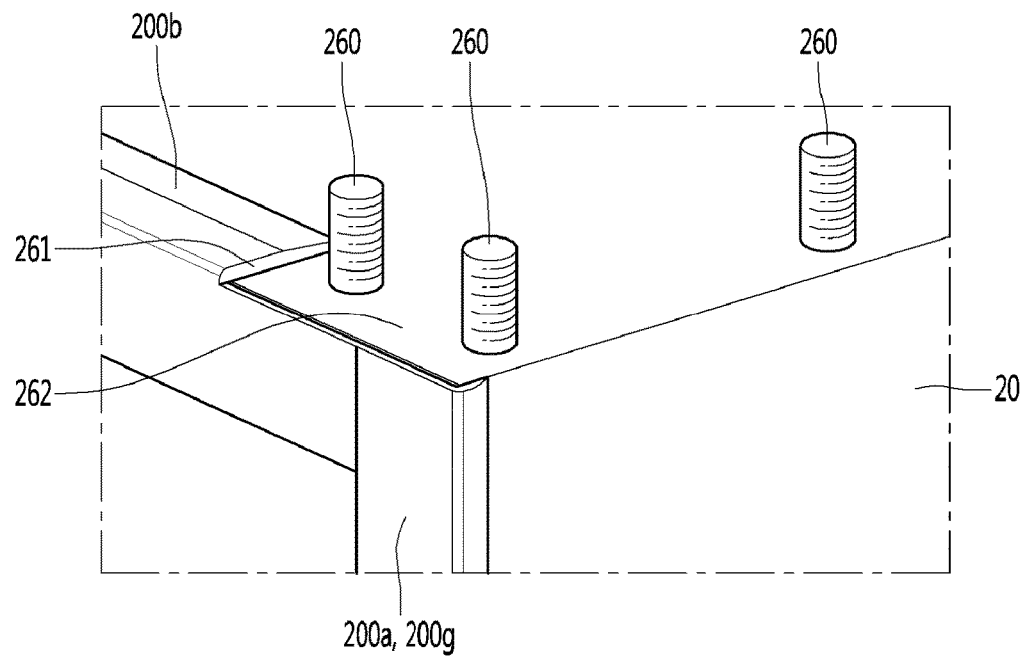
FIGS. 16 and 17 are views illustrating one end part of the sealing frame.
Figure 17:
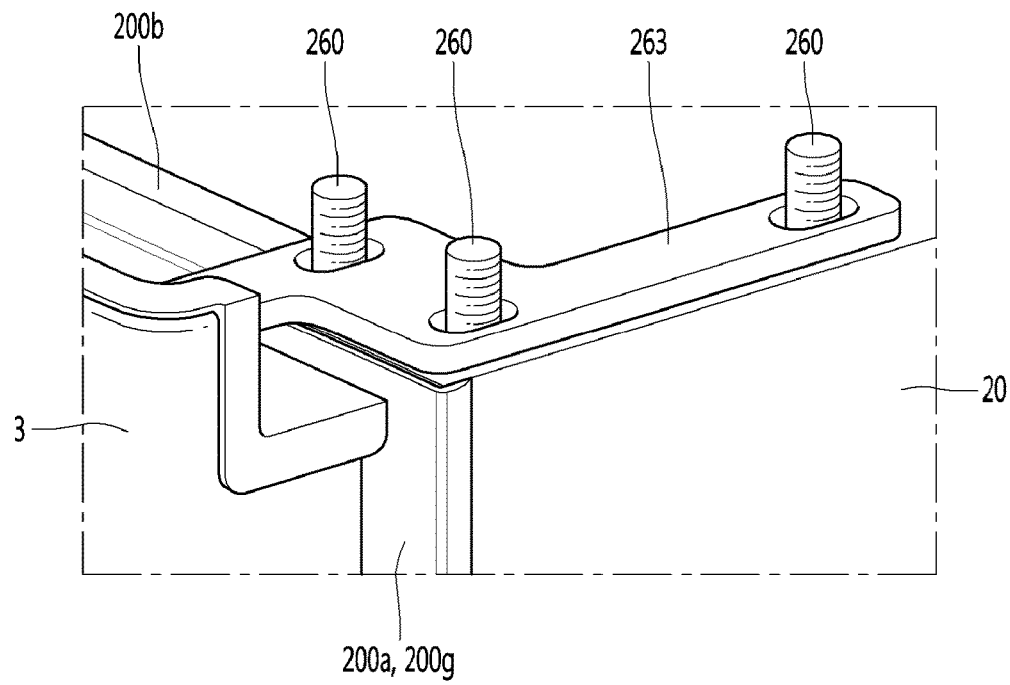

FIGS. 16 and 17 are views illustrating any one end part of the sealing frame, FIG. 16 is a view before the door hinge is installed, and FIG. 17 is a view illustrating a state where the door hinge is installed.

In a case of a refrigerator, a door hinge is provided at the connection portion so that the door-side vacuum adiabatic body can be rotatably coupled to the main body-side vacuum adiabatic body. The door hinge has to have a predetermined strength and can prevent door sagging due to own weight thereof in a state where the door is fastened and prevent the main body from being twisted.

Referring to FIG. 16, so as to fasten the door hinge 263, a door fastener 260 is provided on the main body-side vacuum adiabatic body. Three door fasteners 260 may be provided. The door fastener 260 may be directly or indirectly fixed to the second plate member 20 and/or the reinforcing members 100 and 110 and/or another additional reinforcing member 9 (for example, additional plate which is further provided to outer surface of second plate member). Here, direct fixing can be referred to as by a fusion method such as welding, and indirect fixing can be referred to as a fastening method using an auxiliary fastener or the like instead of a fusion method or the like.

Since the door fastener 260 is required to have a high supporting strength, the door fastener 260 can be fastened while being in contact with the second plate member 20. To this end, the sealing frame 200 may be cut, and the sealing frame 200 to be cut may be the upper sealing frame 200b at the upper corner of the main body-side vacuum adiabatic body. In addition, the sealing frame 200 to be cut may be the right sealing frames 200a, 200f, and 200g at the right corner of the main body-side vacuum adiabatic body and the lower sealing frame 200e at the lower corner of the main body-side vacuum adiabatic body. If the door installation directions are different from each other, the sealing frame 200 to be cut may be the left sealing frame 200a, 200f, and 200g at the left corner of the main body-side vacuum adiabatic body.

The sealing frame 200 to be cut may have a cut surface 261 and the second plate member 20 may have a door fastener seating surface 262 to which the door fastener 260 is fastened. Accordingly, the sealing frame 200 can be exposed to the outside of the door fastener seating surface 262 by the cut of the sealing frame 200, and an additional plate member can be further interposed in the door fastener seating surface 262.

As provided in the drawing, the end part of the sealing frame 200 may not be entirely removed, but a portion of the sealing frame 200 may be removed only at a portion where the door fastener 260 is provided. However, it can be more preferable that the end part of the sealing frame 200 is completely removed so that the door hinge 263 is in contact with and firmly fastened to the vacuum adiabatic body.

Figure 18:
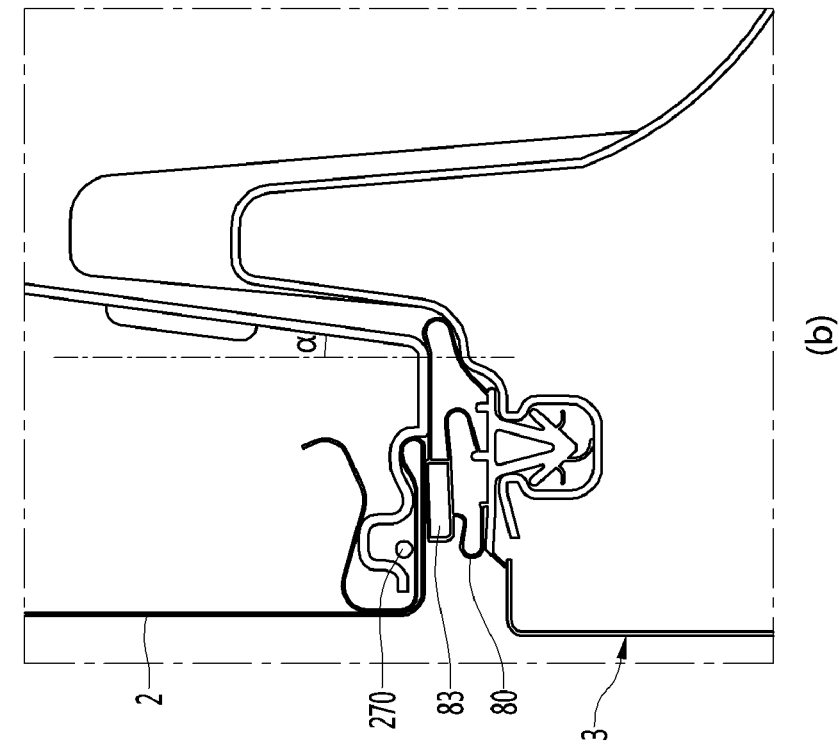
FIG. 18 is a view for explaining an effect of the sealing frame according to the present invention by comparing with the related art, FIG. 18(*a*) is a sectional view illustrating a contact part between a main body-side vacuum adiabatic body and a door according to the present invention, and FIG. 18(*b*) is a sectional view illustrating a door and a main body according to the related art.
Figure 18:
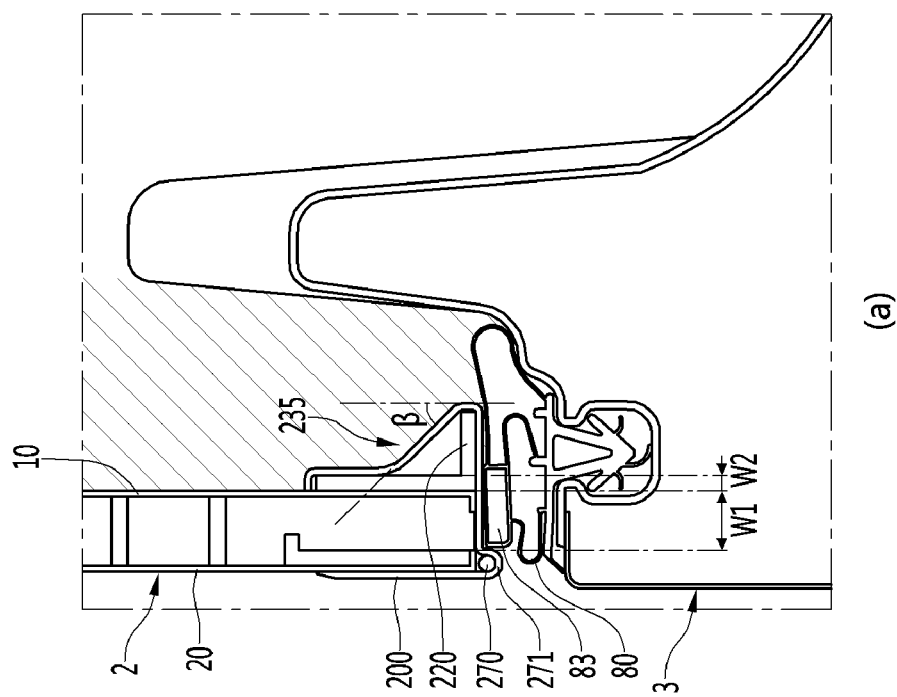

FIG. 18 is a view for explaining an effect of the sealing frame according to the present invention by compared with the related art, FIG. 18(a) is a sectional view illustrating a contact part between a body-side vacuum adiabatic body and a door according to the present invention, and FIG. 18(b) is a sectional view of the main body and the door according to the related art.

Referring to FIG. 18, in the refrigerator, a hotline (i.e., a heater) may be installed at the contact part between the door and the main body to prevent dew formation due to abrupt temperature change. As the hotline is closer to the outer surface and the peripheral portion of the main body, dew formation can be removed even with a small heat capacity.

According to the embodiment, the hotline 270 may be placed in an inner space of a gap between the second plate member 20 and the sealing frame 200. A hotline accommodation portion 271 (or heater cover) in which the hotline 270 is placed may be further provided on the sealing frame 200. Since the hotline 270 is placed outside the conductive resistance sheet 60, the amount of heat transferred to the inside of the refrigerator is small. This makes it possible to prevent dew formation at the contact part of the main body and the door even with a smaller heat capacity. In addition, by allowing the hotline 270 to be placed on a relatively outside of the refrigerator, that is, a portion that is bent between the peripheral portion of the main body and the outer surface of the main body, it is possible to prevent penetration of heat into the space inside the refrigerator.

In the embodiment, the side surface part 220 of the sealing frame 200 may have a portion w1 which is aligned with the gasket 80 and the vacuum space part 50 and a portion w2 which is not aligned with the vacuum space part 50 and aligned with the gasket 80 and the space inside the refrigerator. These are the portions provided by the side surface part 220 to ensure sufficient cold air interruption by the magnet. Accordingly, the sealing action by the gasket 80 can be sufficiently achieved by the sealing frame 200.

In the embodiment, the inclination part 235 inside the refrigerator is provided to be inclined toward the inner surface of the first plate member 10 at a predetermined angle b. This can increase the volume inside the refrigerator like a hatched portion and can provide an effect of enabling a narrow space inside the refrigerator to be capable of being widely used. In other words, it is possible to widely use the space in the vicinity of the door by inclining the inclination part 235 inside the refrigerator in a direction opposite to the predetermined angle a Directed toward the space inside the refrigerator as in the related art. For example, it is possible to accommodate more food in the door and to obtain more space to accommodate the various parts necessary for the operation of the appliance.

Hereinafter, FIGS. 19 to 24 illustrate various embodiments in which the sealing frame 200 is installed.

Figure 19:
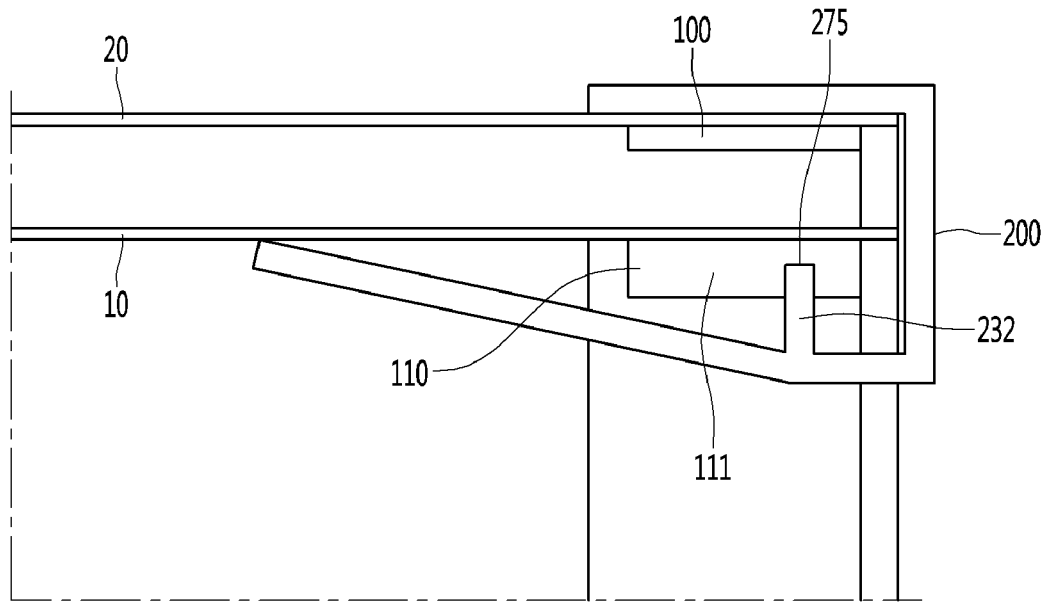
FIGS. 19 to 24 a view illustrating various embodiments in which the sealing frame is installed.

Referring to FIG. 19, the second reinforcing member 110 may provide only the base part 111 and may not provide the protrusion parts 112. In this case, a groove 275 may be provided in the base part 111. The end part of the first member fastening part 232 may be inserted into the groove 275. This embodiment can be preferably applied in a case of a product which can provide sufficient strength without providing the projection part 112 in the second reinforcing member 110.

In a case of the present embodiment, by a process of the end portion of the first member fastening portion 232 being fitted in the groove 275 and aligned when the sealing frame 200 is fastened, so that the sealing frame 200 may be fastened to the end part of the vacuum adiabatic body.

According to the fastening action between the groove 275 and the first member fastening part 232, by only fastening the inner surface part 230 of the sealing frame 200 and the second reinforcing member 110, it is possible to stop the movement of the sealing frame 200 in the y-axis direction.

Figure 20:
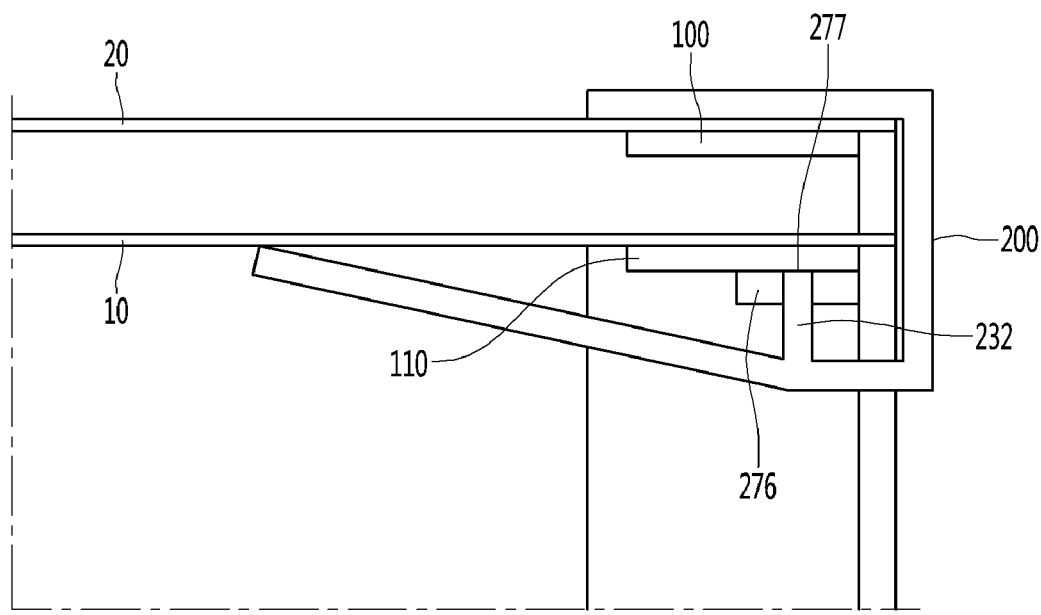

Referring to FIG. 20, this embodiment differs from the embodiment illustrated in FIG. 19 in that the reinforcing base part 276 is further provided in the base part 111. The reinforcing base part 276 is further provided with a groove 277 so that the end part of the first member fastening part 232 can be inserted. This embodiment can be applied when it is necessary to reinforce the strength to a predetermined level even though the protrusion part 112 is not provided to the second reinforcing member 110 due to lack of the actual space, interference, or the like. In other words, it can be preferably applied when the strength reinforcement effect of the main body-side vacuum adiabatic body can be provided at a level of strength reinforcement which can be obtained by further installing a reinforcing base 276 at the outer end of the base part 111.

A groove 277 is provided in the reinforcing base part 276 and the end part of the first member fastening part 232 is fitted and aligned in the groove portion 277 so that the sealing frame 200 is fastened to the end part of the vacuum adiabatic body.

Only by only fastening the inner surface part 230 of the sealing frame 200 and the second reinforcing member 110 even if the fastening action of the groove 277 and the first member fastening part 232 follows, the movement of the sealing frame 200 in the y-axis direction can be stopped.

Figure 21:
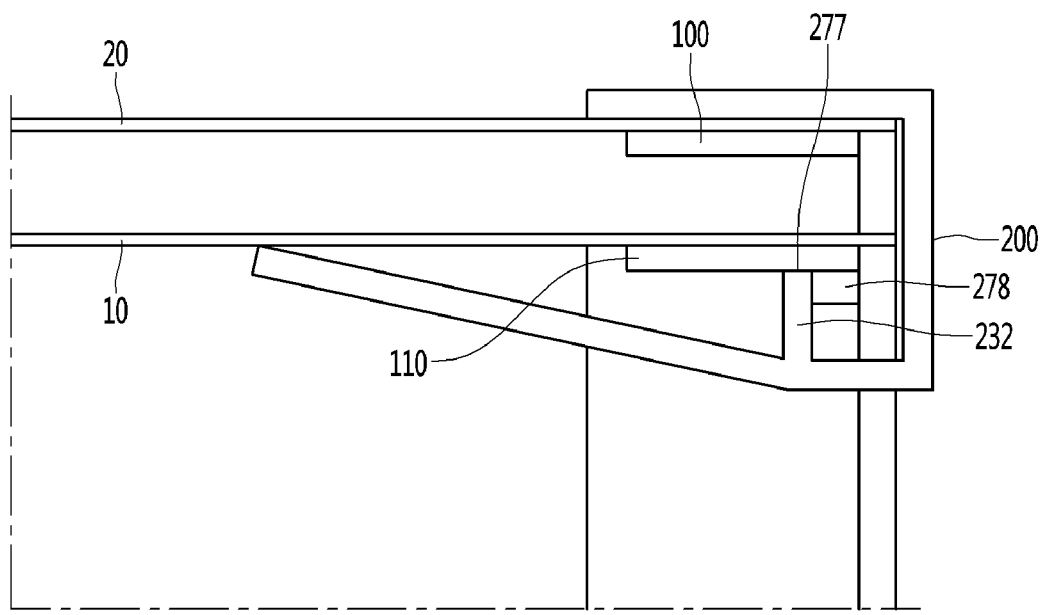

Referring to FIG. 21, the present embodiment differs from the embodiment illustrated in FIG. 19 in that the base part 111 is further provided with the reinforcing protrusion 278. The end portion of the first member fastening part 232 may be engaged to the reinforcing projection 278. Even if the second reinforcing member 110 is not provided with the protrusion portion 112 or the reinforcing base part 276 due to the lack of the installation space, interference, or the like, the present embodiment can be applied when there is a need to reinforce the strength to a predetermined level and to secure that the first member fastening portion 232 is engaged. In other words, by further installing the reinforcing protrusion 278 at the outer end part of the base part 111, the effect of reinforcing the strength of the main body-side vacuum adiabatic body can be obtained. In addition, the reinforcing projection 278 can be preferably applied because the reinforcing projection can provide an engaging action of the first member fastening part 232.

The first member fastening part 232 is engaged and supplied to the reinforcing projection 278 so that the sealing frame 200 can be fastened to the end part of the vacuum adiabatic body.

The embodiment illustrated in FIGS. 19 to 21 illustrates a case where the inner surface part 230 is provided as a single product without being divided into the first member and the second member and is fastened to the vacuum adiabatic body. However, it may be divided into two members without being limited thereto.

Although the embodiment described above provides a case where the second reinforcing member 110 is provided, the following embodiments will be described a case where the sealing frame 200 is provided when no additional reinforcing member is provided inside the first plate member 10.

Figure 22:
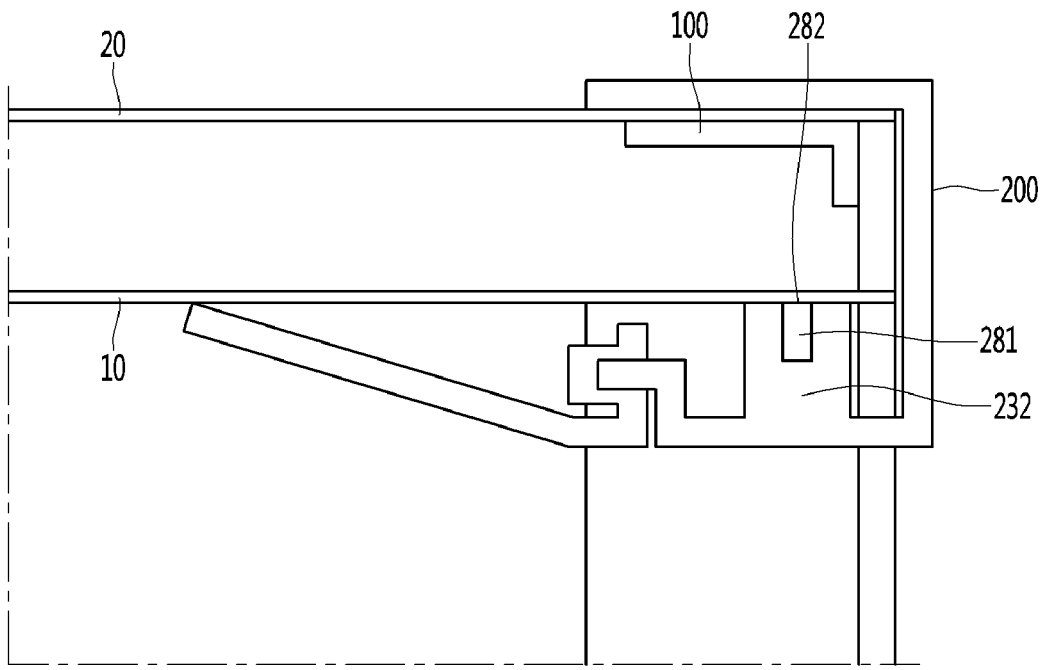

Referring to FIG. 22, the first reinforcing member 100 is provided to reinforce the strength of the vacuum adiabatic body, but the second reinforcing member 110 is not separately provided. In this case, an inner protrusion 281 may be provided on the inner surface of the first plate member 10 so that the sealing frame 200 is fastened. The inner protrusion 281 may be fastened to the first plate member 10 by welding or fitting. The present embodiment can apply in a case where sufficient strength of the main body-side vacuum adiabatic body is obtained only by the first reinforcing member 100, that is, the reinforcing members provided in the vacuum space part 50, or in a case where the reinforcing member can be installed on a side of the second plate member 20.

The first member fastening groove 282 may be provided in the first member fastening part 232 so as to be capable of being fitted and fixed to the inner protrusion 281. By inserting the inner protrusion 281 into the first member fastening groove 282, the fastening position of the sealing frame 200 can be fixed.

Figure 23:
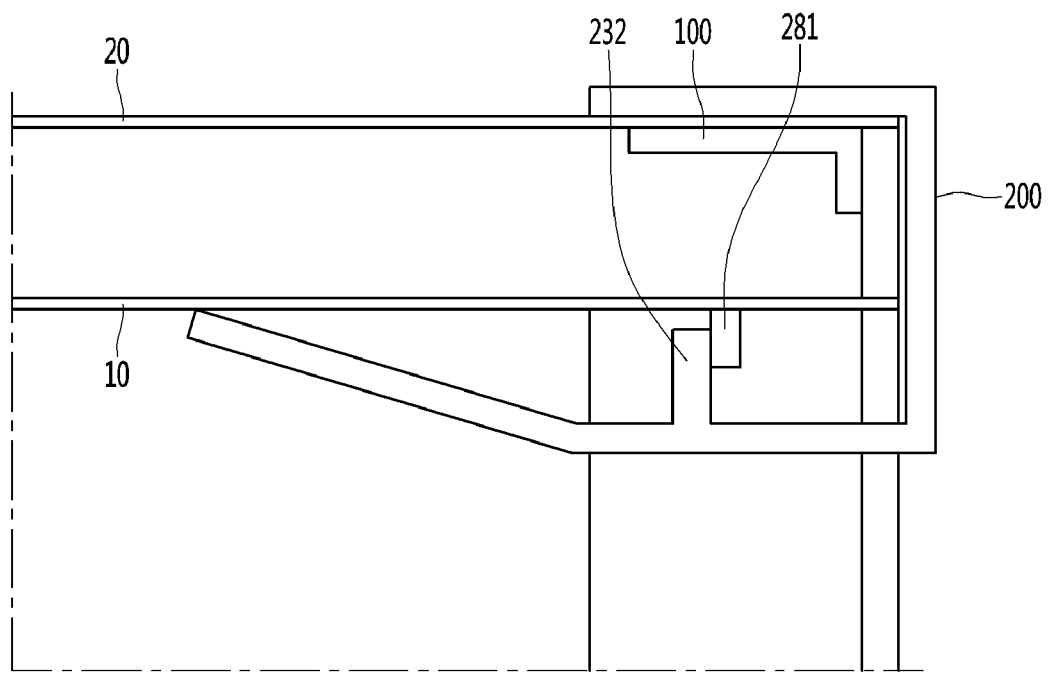

Referring to FIG. 23, it is characteristically different that the first member fastening groove 282 is not provided as compared with the embodiment illustrated in FIG. 22. According to the present embodiment, the position of the sealing frame 200 can be supported by one side end of the first member fastening part 232 being supported by the inner protrusion 281.

In the present embodiment, when being compared with the embodiment illustrated in FIG. 22, there is a disadvantage in that the movement of the sealing frame 200 in the y-axis direction can stop moving only in one direction without being stopped in both directions by the inner protrusion 281 and the first member fastening groove 282. However, an advantage that a worker can conveniently work at the time of fastening the sealing frame 200 can be expected.

The embodiment illustrated in FIGS. 19 to 23 is provided as a configuration in which the first plate member 10 side is fixed, and the second plate member 20 side is allowed the movement such as the sliding. In other words, the second plate member 20 and the outer surface part 210 are allowed to relatively slide and the relative movement of the first plate member 10 and the inner surface part 230 is not allowed. Such a configuration can be configured opposite to each other. Hereinafter, such a configuration is proposed.

Figure 24:
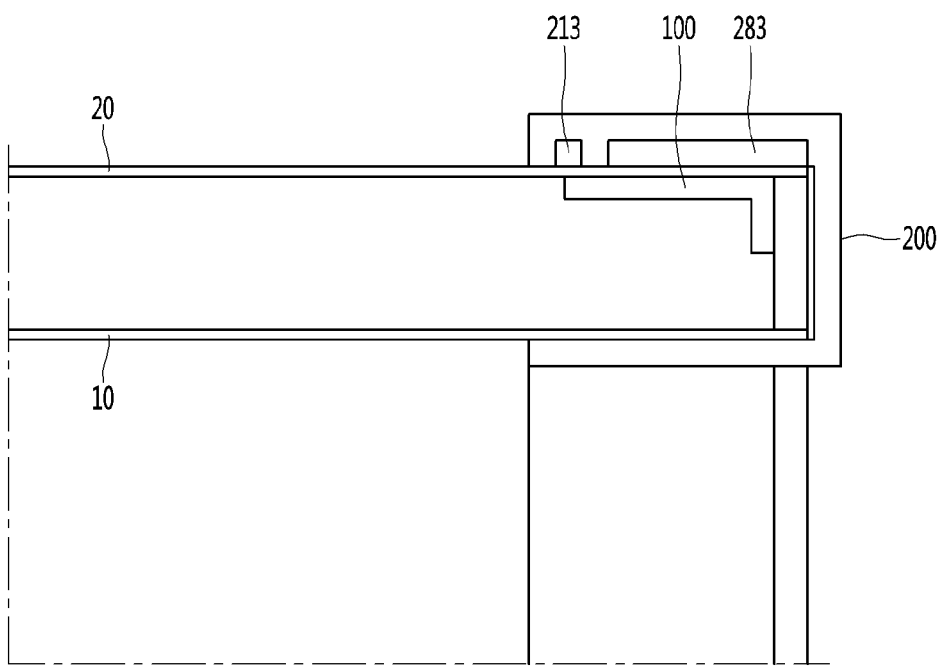

Referring to FIG. 24, an outer protrusion 283 may be provided on the outer surface of the second plate member 20 and an outer engaging part 213 may be provided on the outer surface part 210 of the sealing frame 200. The outer engaging part 213 can be engaged and supported to the outer protrusion 283.

In a case of the present embodiment, the inner surface part 230 of the sealing frame 200 may be allowed to move with respect to the inner surface part of the first plate member 10. In this embodiment, mounting and fixing of the sealing frame 200 differ only in the direction and the same description can be applied.

Various embodiments may be further proposed in addition to the embodiment related to FIG. 24. For example, the reinforcing members 100 and 110 may be further installed on the second plate member 20, and the various structures of FIGS. 19 to 21 may be provided with respect to the reinforcing members. In addition, the outer engaging part 213 may be provided as a groove structure as illustrated in FIG. 22.

According to the present embodiment, there is a difference in a configuration such that the fastening direction of the sealing frame 200 can be provided in a direction opposite to the original embodiment. However, the fundamental function of the sealing frame can be obtained in the same way.

According to the present invention, it is possible to contribute to the commercialization using the vacuum adiabatic body by increasing the stability with respect to the protection and the adiabatic action of a sealing portion between the main body and the door of the appliance to which the vacuum adiabatic body is applied.

According to the present invention, a weak point of a conductive resistance sheet generated when a vacuum adiabatic body is applied to an appliance is complemented in various aspects of strength, external interference, and installation of accessories. Thus, the operation reliability of the appliance such as the refrigerator can be secured without causing any side effects in terms of the vacuum maintenance which is essentially required to appliances to which the vacuum adiabatic body is applied. The industrial application can be highly expected due to the advantages mentioned above.

What is claimed is:

1. A vacuum adiabatic body, comprising:
a first plate;
a second plate;
a vacuum space provided between the first plate and the second plate;
a sealing frame provided at a peripheral portion of the vacuum adiabatic body; and
a conductive resistance sheet configured to reduce heat conduction between the first plate and the second plate, the conductive resistance sheet to connect to the first plate,
wherein the sealing frame includes a side wall provided outside an end of the first plate and an end of the second plate, an inner wall to extend from the side wall and towards the first plate, and an outer wall to extend from the side wall and along the second plate, and
wherein at least one of the side wall and the inner wall is spaced apart from the conductive resistance sheet and is configured to shield the conductive resistance sheet.

2. The vacuum adiabatic body according to claim 1, wherein the side wall is positioned adjacent to outside of the conductive resistance sheet.

3. The vacuum adiabatic body according to claim 2, wherein a length of the side wall is greater than a length of the conductive resistance sheet.

4. The vacuum adiabatic body according to claim 2, wherein the side wall includes a first part to shield the conductive resistance sheet and having a length corresponding to a length of the conductive resistance sheet, and a second part to extend from the first part and to connect to the inner wall,
wherein a gasket is to contact the second part of the side wall.

5. The vacuum adiabatic body according to claim 4, wherein the length of the first part of the side wall is substantially same as a length of the second part of the side wall.

6. The vacuum adiabatic body according to claim 1, further comprising a reinforcing member provided within the vacuum space, and
wherein the reinforcing member is spaced apart from the conductive resistance sheet, and the reinforcing member is to support the first plate or the second plate.

7. The vacuum adiabatic body according to claim 1, further comprising a reinforcing member provided outside the vacuum space, and
wherein the reinforcing member is spaced apart from the conductive resistance sheet, and the reinforcing member is to adhere to the first plate.

8. The vacuum adiabatic body according to claim 7, wherein the reinforcing member contacts the inner wall of the sealing frame such that the inner wall is hooked to the reinforcing member.

9. The vacuum adiabatic body according to claim 7, wherein the inner wall includes a first member fastening part that contacts the reinforcing member, and a second member fastening part to couple to the first member fastening part and have an end portion to support the first plate.

10. The vacuum adiabatic body according to claim 1, wherein the inner wall includes a first end to contact the first plate or to be adjacent to the first plate, and
wherein the outer wall includes a second end to contact the second plate or to be adjacent to the second plate.

11. The vacuum adiabatic body according to claim 10, wherein the inner wall includes an inclined part that is inclined, with respect to the first plate, towards the first end of the inner wall.

12. The vacuum adiabatic body according to claim 1, wherein the inner wall, the side wall, and the first plate are configured to provide an installation space in which to mount an electrical component.

13. The vacuum adiabatic body according to claim 1, wherein the side wall, the inner wall, and the outer wall are integrally formed, and
wherein the inner wall extends from an inner end of the side wall to provide a bend in the sealing frame, and the outer wall extends from an outer end of the side wall to provide another bend in the sealing frame.

14. A vacuum adiabatic body, comprising:
a first plate;
a second plate;
a vacuum space provided between the first plate and the second plate; and
a sealing frame provided at a peripheral portion of the vacuum adiabatic body, and the sealing frame including a side wall provided outside an end of the first plate and an end of the second plate, an inner wall, and an outer wall,
wherein a first one of the inner wall and the outer wall includes a flat surface that is slidable along the corresponding plate, and a second one of the inner wall and the outer wall includes a coupling member that is engaged with the corresponding plate to prevent movement of the second one of the inner wall and the outer wall.

15. The vacuum adiabatic body according to claim 14, wherein the inner wall extends from the side wall to provide a bend in the sealing frame, and the inner wall is to contact the first plate, and
wherein the outer wall extends from the side wall to provide another bend in the sealing frame, and the outer wall is to contact the second plate.

16. The vacuum adiabatic body according to claim 14, further comprising a reinforcing member provided on the first plate,
wherein the coupling member of the inner wall is coupled to the reinforcing member, and the outer wall has the flat surface configured to move with respect to the second plate.

17. The vacuum adiabatic body according to claim 14, wherein the inner wall has the flat surface configured to move with respect to the first plate, and
wherein the coupling member of the outer wall includes a hook to couple to a protrusion of the second plate, the protrusion provided at an outer surface of the second plate.

18. The vacuum adiabatic body according to claim 14, further comprising a conductive resistance sheet to reduce heat conduction between the first plate and the second plate, the conductive resistance sheet to connect to the first plate,
wherein the side wall is positioned adjacent to outside of the conductive resistance sheet.

19. A vacuum adiabatic body, comprising:
a first plate;
a second plate;
a vacuum space provided between the first plate and the second plate;
a sealing frame provided at a peripheral portion of the vacuum adiabatic body, and including a side wall provided outside an end of the first plate and an end of the second plate, and an inner wall to extend from the side wall and provide a bend in the sealing frame; and
a reinforcing member provided within a space defined by the first plate and the side wall and the inner wall of the sealing frame,
wherein the reinforcing member includes a first part to contact the first plate and a second part to contact the inner wall.

20. The vacuum adiabatic body according to claim 19, further comprising an additional reinforcing member provided within the vacuum space,
wherein the additional reinforcing member is to adhere to the second plate.

* * * * *